US007447499B2

(12) United States Patent
Bridges et al.

(10) Patent No.: US 7,447,499 B2
(45) Date of Patent: Nov. 4, 2008

(54) INTELLIGENT ROAMING SYSTEM WITH OVER THE AIR PROGRAMMING

(75) Inventors: Jesse Bradley Bridges, Austin, TX (US); Cameron Kelly Coursey, Cedar Park, TX (US); Mark Steven Wuthnow, Austin, TX (US)

(73) Assignee: AT&T Labs, Inc., Austin, TX (US)

( * ) Notice: Subject to any disclaimer, the term of this patent is extended or adjusted under 35 U.S.C. 154(b) by 30 days.

(21) Appl. No.: 11/480,370

(22) Filed: Jul. 5, 2006

(65) Prior Publication Data

US 2006/0252427 A1  Nov. 9, 2006

Related U.S. Application Data

(63) Continuation of application No. 10/298,944, filed on Nov. 19, 2002, now Pat. No. 7,096,015, which is a continuation of application No. 10/121,859, filed on Apr. 15, 2002, now Pat. No. 6,546,246, which is a continuation of application No. 09/567,279, filed on May 9, 2000, now Pat. No. 6,397,064, which is a continuation of application No. 09/035,850, filed on Mar. 6, 1998, now Pat. No. 6,148,197.

(51) Int. Cl.
*H04M 3/00* (2006.01)
(52) U.S. Cl. ..................... 455/419; 455/418
(58) Field of Classification Search ............ 455/418, 455/419, 421, 432.1, 433, 435.1, 435.2, 435.3, 455/436, 437, 525
See application file for complete search history.

(56) References Cited

U.S. PATENT DOCUMENTS

| 4,916,728 | A | 4/1990 | Blair |
|---|---|---|---|
| 5,020,091 | A | 5/1991 | Krolopp |
| 5,093,926 | A | 3/1992 | Sasuta |
| 5,101,500 | A | 3/1992 | Marui |
| 5,159,625 | A | 10/1992 | Zicker |
| 5,276,905 | A | 1/1994 | Hurst et al. |
| 5,297,191 | A | 3/1994 | Gerszberg |
| 5,297,192 | A | 3/1994 | Gerszberg |
| 5,301,223 | A | 4/1994 | Amadon et al. |
| 5,357,561 | A | 10/1994 | Grube |
| 5,412,375 | A | 5/1995 | Wood |
| 5,428,666 | A | 6/1995 | Fyfe et al. |
| 5,442,806 | A | 8/1995 | Barber et al. |

(Continued)

OTHER PUBLICATIONS

"TDMA Cellular/PCS-Radio Interface-Mobile Station-Base Station Compatibility-Digital Control Channel," by Telecommunications Industry Association, published Oct. 1996.

(Continued)

*Primary Examiner*—Lewis G West
(74) *Attorney, Agent, or Firm*—Greenblum & Bernstein, P.L.C.

(57) ABSTRACT

A mobile station is used by one of a plurality of subscribers of a home area wireless service provider. The mobile station includes a memory for storing a home area wireless network identity and a plurality of preferred wireless network identities. The mobile station further including a controller controlling said mobile station to connect to the home area wireless network when in a home area and controlling said mobile station to connect to one of the preferred wireless networks when outside the home area.

20 Claims, 9 Drawing Sheets

U.S. PATENT DOCUMENTS

| | | |
|---|---|---|
| 5,463,675 A | 10/1995 | Gerszberg |
| 5,504,803 A | 4/1996 | Yamada et al. |
| 5,524,135 A | 6/1996 | Mizikovsky et al. |
| 5,551,058 A | 8/1996 | Hutcheson et al. |
| 5,586,338 A | 12/1996 | Lynch et al. |
| 5,590,397 A | 12/1996 | Kojima |
| 5,615,248 A | 3/1997 | Norimatsu |
| 5,642,398 A | 6/1997 | Tiedemann |
| 5,673,308 A | 9/1997 | Akhavan |
| 5,722,073 A | 2/1998 | Wallstedt et al. |
| 5,734,980 A | 3/1998 | Hooper et al. |
| 5,761,618 A | 6/1998 | Lynch et al. |
| 5,781,620 A | 7/1998 | Montgomery et al. |
| 5,784,693 A | 7/1998 | Barber et al. |
| 5,787,347 A | 7/1998 | Yu et al. |
| 5,802,502 A | 9/1998 | Gell et al. |
| 5,832,367 A | 11/1998 | Bamburak et al. |
| 5,862,490 A | 1/1999 | Sasuta et al. |
| 5,950,130 A | 9/1999 | Coursey |
| 6,044,265 A | 3/2000 | Roach, Jr. |
| 6,128,489 A | 10/2000 | Seazholtz et al. |
| 6,148,197 A | 11/2000 | Bridges et al. |
| 6,397,064 B1 | 5/2002 | Bridges et al. |
| 6,546,246 B1 | 4/2003 | Bridges et al. |

OTHER PUBLICATIONS

Recommendation GSM 02.11, Service Accessibility, Version 3.7.0, Released by ETSI/PT12, Nov. 1992.

Recommendatio GSM 02.11-DCS, Service Accessibility, Version 3.1.0, Released by ETSI/PT12, Nov. 1992.

Recommendation GSM 02.11-DCS, Service Accessibility, Version 3.0.1, Release 92, Phase 1, Released by ETSI/PT12 12 V, Feb. 1992.

Stage 1 Description for System Selection for Preferred Roaming, Version 1.7, Telecommunications Industries Association (TIA), TR45.5 Sub-Committee, Santa Barbara, CA, Feb. 9, 1996.

System Selection for Preferred Roaming/Stage 2 & 3 Description, Version 1.2, Telecommunications Industries Association (TIA), Enhanced Roaming Team, Feb. 9, 1996.

INTELLIGENT ROAMING SYSTEM WITH OVER THE AIR PROGRAMMING

CROSS-REFERENCE TO RELATED APPLICATIONS

This application is a continuation of U.S. patent application Ser. No. 10/298,944, filed on Nov. 19, 2002, now U.S. Pat. No. 7,096,015 which is a continuation of U.S. patent application Ser. No. 10/121,859, filed on Apr. 15, 2002, which is now U.S. Pat. No. 6,546,246, which is a continuation of U.S. patent application Ser. No. 09/567,279, filed on May 9, 2000, which is now U.S. Pat. No. 6,397,064, which is a continuation of U.S. patent application Ser. No. 09/035,850, filed on Mar. 6, 1998, which is now U.S. Pat. No. 6,148,197, the contents of all of which are incorporated herein in their entireties.

BACKGROUND OF THE INVENTION

1. Field of the Invention

The present invention relates to the field of telecommunications. More particularly, the present invention relates to cellular, Personal Communications Services (PCS) and other wireless network systems, and mobile stations having intelligent roaming and over-the-air programming features.

2. Related Application Information

The present disclosure relates to subject matter contained in U.S. patent application Ser. No. 08/828,172 filed on Mar. 18, 1997, issued as U.S. Pat. No. 5,950,130 on Sep. 7, 1999, which is expressly incorporated herein by reference in its entirety.

3. Background and Material Information

The use of wireless or mobile communication devices has increased greatly in recent years. Mobile and cellular telephones have enabled mobile station users to roam over large geographic areas while maintaining immediate access to telephony services. Mobile stations include portable units, units installed in vehicles and fixed subscriber stations. Mobile stations comprising cellular telephones or wireless handsets are operable in cooperation with cellular or Personal Communications Services (PCS) communications systems. Cellular communication systems (wireless carriers) typically provide service to a geographic market area by dividing the area into many smaller areas or cells. Each cell is serviced by a radio transceiver (i.e., a transmitter-receiver base station or cell site). The cell sites or base stations may be connected to Mobile Telephone Switching Offices (MTSOs) or Mobile Switching Centers (MSCs) through landlines or other communication links, and the MTSOs may, in turn, be connected via landlines to the Public Switched Telephone Network (PSTN).

FIG. 1 illustrates the basic components of a conventional cellular network. As shown in FIG. 1, a mobile station 38 may place or receive calls by communicating with a cell site 30 or a cell site 40, depending upon the geographic location of the mobile station and the cell coverage area that is provided by each cell site (i.e., cell coverage area 35 of cell site 30 or cell coverage area 45 of cell site 40). For purposes of illustration, mobile station 38 is depicted in FIG. 1 as being able to communicate with either cell site 30 or cell site 40, even though the mobile station is not illustrated as being located within cell coverage area 35 or cell coverage area 45. Under normal operating conditions, the extent to which mobile station 38 will be able to communicate with cell site 30 or cell site 40 will depend on the geographic location of the mobile station and the size of the cell coverage area of each cell site.

Further, although only two cell sites are depicted in FIG. 1, the entire cellular network may include, for example, more than two cell sites. In addition, more than one cell site may be connected to each MTSO.

Mobile station 38 may include a conventional cellular telephone unit with a transceiver and antenna to communicate by, for example, radio waves with cell sites 30 and 40. Various air-interface technologies may be implemented to facilitate communication between the mobile station and the cell sites. In addition, various service offerings may be made available to mobile station users. Cell sites 30 and 40 may both include a radio transceiver and be connected by landlines 16 or other communication links to MTSOs 24 and 28. The PSTN 12 is also connected to each MTSO 24 and 28 by landline 16 or other communication links.

The MTSOs 24 and 28 may be conventional digital telephone exchanges that control the switching between the PSTN 12 and the cell sites 30 and 40 to provide wireline-to-mobile, mobile-to-wireline and mobile-to-mobile call connectivity. The MTSOs 24 and 28 may also (I) process mobile station status data received from the cell site controllers; (ii) handle and switch calls between cells; (iii) process diagnostic information; and (iv) compile billing information. The transceiver of each cell site 30 and 40 provides communications, such as voice and data, with mobile station 38 while it is present in its geographic domain. The MTSOs 24 and 28 may track and switch mobile station 38 from cell site to cell site, as the mobile station passes through various coverage areas. When mobile station 38 passes from one cell to another cell, the MTSO of the corresponding cell may perform a "hand-off" that allows the mobile station to be continuously serviced.

In the current North American cellular system, any given market area may be serviced by up to two competing service providers of cellular air time communication services (wireless carriers). By Federal Communications Commission (FCC) regulations, the two competing wireless carriers are assigned different groups of frequencies through which services are provided. A frequency set typically includes control channels and voice channels. The control channels are used for preliminary communications between a mobile station and a cell site for setting up a call, after which a voice channel is assigned for the mobile station's use on that call. The assigned frequency sets are generally referred to as "A band frequencies" and "B band frequencies". Typically, the A band frequencies are reserved for non-wireline service providers, while the B band frequencies are reserved for the incumbent wireline service providers. While each frequency set for a given cellular service market area is assigned to only one service provider, in different market areas the same frequency set may be assigned to different service providers or companies.

Depending upon which wireless carrier the user of the mobile station subscribes to, the home frequency set of the user may correspond to the A frequency band or the B frequency band. Whenever a call is placed by the mobile station, the unit will ordinarily attempt to use the home frequency set to establish the call. If a call is handled outside of the user's home market area, then the unit is said to be "roaming" and service will be attempted through a frequency set of a non-home service provider. Typically, the user's home service provider will have a roaming agreement or reciprocal billing arrangement with the non-home service provider to permit service to be extended to the user's mobile unit when it is roaming in the non-home service provider's market area.

Whereas cellular typically operates in the 800-900 MHZ range, PCS is expected to operate in the 1.5 to 1.8 GHz range.

In North America, the FCC has awarded PCS licenses in six additional bands (i.e., the A-F carrier blocks or bands). PCS covers a broad range of individualized telecommunication services that let users communicate irrespective of where they are located. With PCS, personalized numbers are assigned to individuals rather than to the mobile stations, and call completion is performed regardless of the location of the user. PCS may be implemented through conventional macro-cellular techniques or through Personal Communications Networks (PCN) that utilize light, inexpensive handheld handsets and communicate via low-power antennas that are intended to operate in a similar fashion to that of large scale cellular telephone networks, but operate within small geographic or microcellular areas. It is anticipated that PCNs will operate within the same frequency band in most countries (e.g., 1850-1990 MHZ), while cellular systems will operate in different frequency bands in various countries.

The mobile station may include a memory device, such as a number assignment module (NAM), in which an assigned phone number and a system identification code (SID) and/or System Operator Code (SOC) is stored to uniquely identify the home service provider for the unit. In the North American cellular system, each provider within a market area is assigned a distinct, fifteen bit SID. IS-136 service providers are also assigned a 12-bit SOC for use throughout all their market areas. In Europe, on the other hand, the Global System for Mobile Communications (GSM) standard (see, for example, *Recommendation GSM 02.11, Service Accessibility*, European Telecommunications Standards Institute, 1992) defines a process for network selection based on the mobile station reading the GSM equivalent of the SID, called the Public Land Mobile Network (PLMN) identity.

The SID or equivalent system identification number is broadcast by each wireless carrier and is used by the mobile station to determine whether or not the mobile station is operating in its home network or if it is operating in a roaming condition. The mobile station makes this determination by reading the SID broadcast in the cellular market area where it is located, and comparing it to the home SID stored in the NAM of the cellular phone unit. If the SIDs do not match, then the mobile station is roaming, and the mobile station must attempt to gain service through a non-home service provider. Due to the imposition of a fixed surcharge or higher per unit rate, the airtime charges when the mobile station is roaming are customarily higher than when it is operating within its home network.

Operation under a roaming condition is often under the control of the mobile station user. The user can select whether the mobile station will operate in a Home System Only, A Band Only, B Band Only, A Band Preferred, or B Band Preferred operating mode. The user typically controls the system preference and mode operation through menu choice or selection. This current method of roaming control is conventionally known as "Preferred System Selection". In the most common roaming situation, the mobile station remains on the same band as the home cellular network. That is, if the mobile station is homed to a cellular network with an odd numbered SID (which is normally assigned to an A band cellular service provider), then the mobile station will obtain service from the A band cellular service provider when roaming.

Occasionally, the home service provider will program a mobile station with negative SIDs. Negative SIDs correspond to SIDs on which the mobile station should not obtain service. Negative SIDs may be used, for example, if roaming agreements are not in place between different cellular service providers. An example of a mobile station that utilizes negative SIDs is disclosed in BLAIR, U.S. Pat. No. 4,916,728. As an alternative to negative SIDs, some mobile stations are programmed with positive or preferred SIDs. Positive or preferred SIDs are SIDs on which the mobile station should attempt to obtain service when selecting a cellular carrier frequency. An example of a mobile station that utilizes preferred SIDs is disclosed in BARBER et al., U.S. Pat. No. 5,442,806. The use of preferred SIDs facilitate the selection of a preferred service provider when the mobile station is roaming.

With the maturation of mobile communication, a variety of advanced services or service offerings have become available to mobile station users. For example, mobile station users may now elect to subscribe to messaging services (such as voice mail, text messaging or Short Message Service (SMS)), or other services such as call waiting indication, voice privacy, etc. SMS and other forms of teleservices may be provided to a mobile station via a message center connected to the cellular network. However, when roaming in another market area, certain wireless carriers in that market may not support all of the advanced services to which the user subscribes. Consequently, when roaming, the user may lose use of some or all of the advanced services that the user is accustomed to using.

Moreover, some large companies have come to depend upon the use of mobile stations and wireless communications. As a result of the large volume of such usage, they have set up corporate accounts with wireless carriers. These accounts are referred to by the wireless carriers as National Accounts. Preferred roaming rates may be negotiated for a National Account with particular wireless carriers in certain geographic market areas. Thus, when a mobile station roams to one of these market areas, the National Account subscriber may prefer a different wireless carrier from the carrier preferred by the mass market. Furthermore, a corporation may require its personnel to subscribe to particular advanced services, e.g., a messaging service so the personnel is always reachable. Conventional mobile station equipment and systems do not permit a corporation to control which carrier roaming personnel will use in order to obtain beneficial rates and to receive selected required advanced services.

Thus, there is a need in the cellular and mobile network industries to provide some form of intelligent or automatic roaming in which the mobile station obtains service on the cellular network with which the home cellular service provider has the best roaming agreement (or the cellular service provider's own network in the roaming area, if it is not in the same band as the home system), and/or which supports the services the user requires. Two factors have primarily led to this need. First, large cellular service providers rarely operate in the same band in all markets. Second, cellular service providers have chosen to offer different advanced technologies or services. Consequently, the mobile station may have to change bands to obtain the required services.

Further, there is a need to provide intelligent roaming capabilities for a mobile station which will not require any changes to present network interface standards (e.g. IS-41) or air interface standards (e.g., IS-136, IS-91A, IS-95). Such features are desirable in order to permit new intelligent roaming capabilities to be readily utilized by a mobile station and to allow seamless integration of such capabilities without modification to present industry standards. For more information on network interface standards such as Interim Standard 41 (IS-41), see, for example, TIA/EIA-IS-41.5-C, *Cellular Radiotelecommunications Intersystem Operations: Signaling Protocols*, Telecommunications Industry Association, February 1996. For more information on air-interface standards such as Interim Standards 95 and 136 (IS-95 and IS-136), see, for example, TIA/EIA-IS-95-A, *Mobile Station-Base Station Compatibility Standard for Dual-Mode Wideband Spread Spectrum Cellular Systems*, Telecommunications Industry Association, May 1995; TIA/EIA-IS-136.1-A, *TDMA Cellular/PCS-Radio Interface-Mobile Station-Base Station Compatibility-Digital Control Channel*, Telecommunications Industry Association, October 1996; TIA/EIA-IS-136.2-A, *TDMA Cellular/PCS-Radio Interface-Mobile Station-Base Station Compatibility-Traffic Channels and FSK Control Channel*, Telecommunications Industry Association, October 1996; and TIA/EIA/IS-136.1-A-1, *Addendum No. 1 to TIA/EIA/IS-136.1-A*, Telecommunications Industry Association, November 1996.

Another desirable feature is to provide over-the-air programming of a mobile station to permit reprogramming of the mobile station with new intelligent roaming information as it becomes available. Such a feature would permit the "intelligence" that is incorporated into the mobile station to be updated and stored with ease, without requiring the user to bring the mobile station to a technician or operator for reprogramming.

SUMMARY OF THE INVENTION

According to an aspect of the present invention, an apparatus is provided for providing preferred wireless carrier information for use by a mobile station when the mobile station is roaming outside of a home market area. The invention provides intelligent roaming capabilities across single and multiple hyperbands. The apparatus comprises a database, a generator, and a data-providing device. The database stores preferred wireless carrier identities for a plurality of market areas based upon predetermined classes of service. The generator generates a list of the preferred wireless carrier identities based upon a selected class of service and the home market area of the mobile station. The data-providing device provides the generated list to the mobile station designated with the selected class of service.

Preferably, the database further comprises a plurality of predetermined home market areas, and the generated list of preferred wireless carrier identities is based upon the selected class of service and a selected one of the plurality of home market areas. Moreover, the data-providing device provides the generated list to the mobile station designated with the selected class of service and the selected home market area.

In another embodiment the database further comprises a plurality of national accounts, and the generated list of preferred wireless carrier identities is based upon the selected class of service and a selected national account. In this embodiment, the data-providing device provides the generated list to each mobile station designated with the selected class of service and the selected national account.

According to another embodiment the list includes a backup carrier identity for use in the event service from the preferred wireless carrier is not available. Moreover, the data-providing device provides the list of preferred wireless carrier identities to the mobile stations via wireless communication.

According to another aspect of the present invention, the generator generates the list of preferred wireless carrier identities based upon the plurality of wireless carriers' roaming airtime rates, services or air interface technology provided for each of the plurality of market areas. The generator may then update the list of preferred wireless carrier identities when one of the plurality of wireless carriers changes a communication characteristic (such as roaming airtime rates the wireless carrier charges for a market areas, and services the wireless carrier offers to market areas) for one of the plurality of market areas. The data-providing device provides the updated list of preferred wireless carrier identities to all mobile stations previously provided with the list the generator updated.

Preferably each mobile station is assigned to one of the predetermined classes of service based upon services to which the mobile station user subscribes. The list of preferred wireless carrier identities comprises a plurality of entries indicating a system identification number (and/or System Operator Code) and a corresponding frequency band for each preferred wireless carrier.

According to another embodiment of the present invention, a mobile station is provided that comprises a memory and a selector. The memory stores a list of preferred wireless carrier identities based upon a selected class of service for a plurality of market areas. The selector automatically selects a preferred wireless carrier from the list stored in the memory when the mobile station is roaming and enters one of the market areas of the plurality of market areas. Preferably, the mobile station switches to the preferred wireless carrier, selected from the list of preferred wireless carrier identities, to use for communication in response to the mobile station roaming to the predetermined market area. The list of preferred wireless carrier identities may be downloaded to the memory from a message center via a communications link established between the message center and the memory. The communications link may comprise a wireless communications link and/or a hard-wire or wired communications link. Programming of the mobile station unit and entry of preferred wireless carrier identities may also be performed manually by using the keypad of the mobile station unit.

According to another embodiment of the present invention, a system is provided for selecting preferred wireless carriers from a plurality of wireless carriers for use by a mobile station when the mobile station is roaming outside of a home market area. The system comprises a database, a generator, a data-providing device, a memory and a selector. The database stores preferred wireless carrier identities for a plurality of market areas based upon predetermined classes of service. The generator generates a list of the preferred wireless carrier identities based upon a selected class of service and the home market area of the mobile station. The data-providing device provides the generated list to each mobile station designated with the selected class of service. The memory, provided within the mobile station, stores the generated list of preferred wireless carrier identities. The selector selects a preferred wireless carrier from the list stored in the memory when the mobile station enters one of the market areas of the plurality of market areas. Thus, the mobile station switches to the preferred wireless carrier, selected from the list of preferred wireless carrier identities, for communication in response to the mobile station roaming to the predetermined market area.

Preferably, the database further comprises a plurality of predetermined home market areas and national accounts. Thus, the generated list of preferred wireless carrier identities is based upon the selected class of service, a selected national account, and a selected one of the plurality of home market areas.

According to another embodiment of the present invention, a method is provided for selecting a preferred wireless carrier for a mobile station to enable wireless communication when the mobile station is roaming outside of a home market area. A database of preferred wireless carrier identities for a plurality of market areas based upon predetermined classes of service is compiled at a predetermined location remote from the mobile station, and a list of preferred wireless carrier identities is generated based upon a selected class of service and the plurality of market areas. The list is provided to a storage device associated with the mobile station designated with the selected class of service to enable a selection of the preferred wireless carrier. The method comprises receiving a signal transmitted by a wireless carrier containing the wireless carrier's identity, comparing the wireless carrier's identity to the database of preferred wireless carrier identities stored in the mobile station, and switching a communications mode within the mobile station so as to obtain service from the highest priority wireless carrier available.

According to another embodiment of the present invention, an apparatus is provided for selecting preferred wireless carriers from a plurality of wireless carriers for use by a mobile station when the mobile station is roaming outside of a home market area. The apparatus comprises a database, a generator, a data-providing device, a mobile station, a memory, and a selector. The database stores preferred wireless carrier identities for a plurality of market areas based upon predetermined classes of service, predetermined national accounts and predetermined home market areas. The generator generates a list of the preferred wireless carrier identities based upon a selected class of service, a selected national account, a selected home market area and the plurality of market areas. The data-providing device provides the generated list to mobile stations designated with the selected class of service, selected national account and selected home market area. The mobile station is useable in a roaming environment. The memory is associated with the mobile station and stores the generated list of preferred wireless carrier identities. The selector selects a preferred wireless carrier from the list stored in the memory when the mobile station enters a market area of the plurality of market areas. Preferably, the data-providing device transmits the list of preferred wireless carrier identities via over-the-air programming.

According to another embodiment of the present invention, a method is provided for downloading a list of wireless carrier identities stored in a database to a mobile station's memory. The database contains the list of wireless carrier identities from which the mobile station selects a preferred wireless carrier when the mobile station is roaming outside of a home market area to use for wireless communication. The database has a plurality of national account fields, a plurality of home market area fields, and a plurality of class of service fields. Each mobile station is assigned to a national account, a home market area and a class of service. The database determines the list of preferred wireless carrier identities for each class of service field, within each national account field within each market area field. Memory is provided within the mobile station for storing the list of wireless carrier identities and preferred wireless carrier identities corresponding to the mobile station's wireless carrier identities and national account, class of service and home market area. The method comprises determining when the list of wireless carrier identities stored in the mobile station's memory is outdated. When the list is outdated: determining if the mobile station is registered with its home location register; locating the mobile station and downloading an updated list of carrier identities to the mobile station when it is determined the mobile station is registered with the home location register; notifying a message center when the mobile station registers and then downloading a new list of preferred carrier identities to the mobile station when it is determined the mobile station is not registered with the home location register (e.g., when delivery is pending). Preferably, the downloading further comprises a throttling scheme which controls the number of mobile stations to which the downloading occurs during a predetermined period of time.

DESCRIPTION OF THE DRAWINGS

The present invention is further described in the detailed description which follows, by reference to the noted plurality of drawings by way of non-limiting examples of preferred embodiments of the present invention, in which like reference numerals represent similar parts throughout the several views of the drawings, and wherein.

DETAILED DESCRIPTION OF THE PREFERRED EMBODIMENTS

Referring to the accompanying drawings, a detailed description of the preferred embodiments and features of the present invention will be provided.

The present invention relates to a mobile station with intelligent roaming and/or over-the-air programming features. The present invention permits a mobile station to immediately obtain service on a preferred cellular, PCS or other wireless network system meeting a subscriber's service requirements. The selection or designation of such a system carrier may be configured to comply with, for example, preferences of a corporation having a National Account with the home wireless carrier, when there are multiple bands available.

According to an aspect of the present invention, a Preferred System Identification List (PSL) (for cellular systems) and/or an Intelligent Roaming Database Downloading (IRDB) (for cellular, PCS and other wireless systems) is stored within a memory or storage device of the mobile station. When the mobile station is roaming, the PSL or IRDB is accessed to indicate the band where the mobile station will find a preferred system. If the mobile station is capable of operating in either a cellular or PCS system, the mobile station may access the PSL or IRDB depending on the type of system that it is located in or its current operating mode. The present invention, however, is not limited to cellular or PCS networks, and may be used with other wireless networks and environments, such as Wireless Communication Services (WCS), Enhanced Specialized Mobile Radio (ESMR), iDENS, and reproposed channels 60-69. The invention, therefore, may provide intelligent roaming capabilities across single and multiple hyperbands and is not limited to cellular and PCS systems. Further, the preferred system will be a system which supports the service requirements of a particular subscriber. The preferred system may also satisfy the preferences of a particular National Account reflecting preferred rates negotiated for that National Account in the market area that the mobile station is roaming in. Further, it is possible that the preferred system be defined and/or selected according to a required or preferred air-interface technology (e.g., TDMA, CDMA, PACS, GSM and PCS-1900) to be utilized by the mobile station.

In addition, according to another aspect of the present invention, programming of the PSL/IRDB in the mobile station may be performed over-the-air (i.e., by wireless communication) to permit easy reprogramming of the mobile station with new preferred system information as it becomes available.

Figure 1:
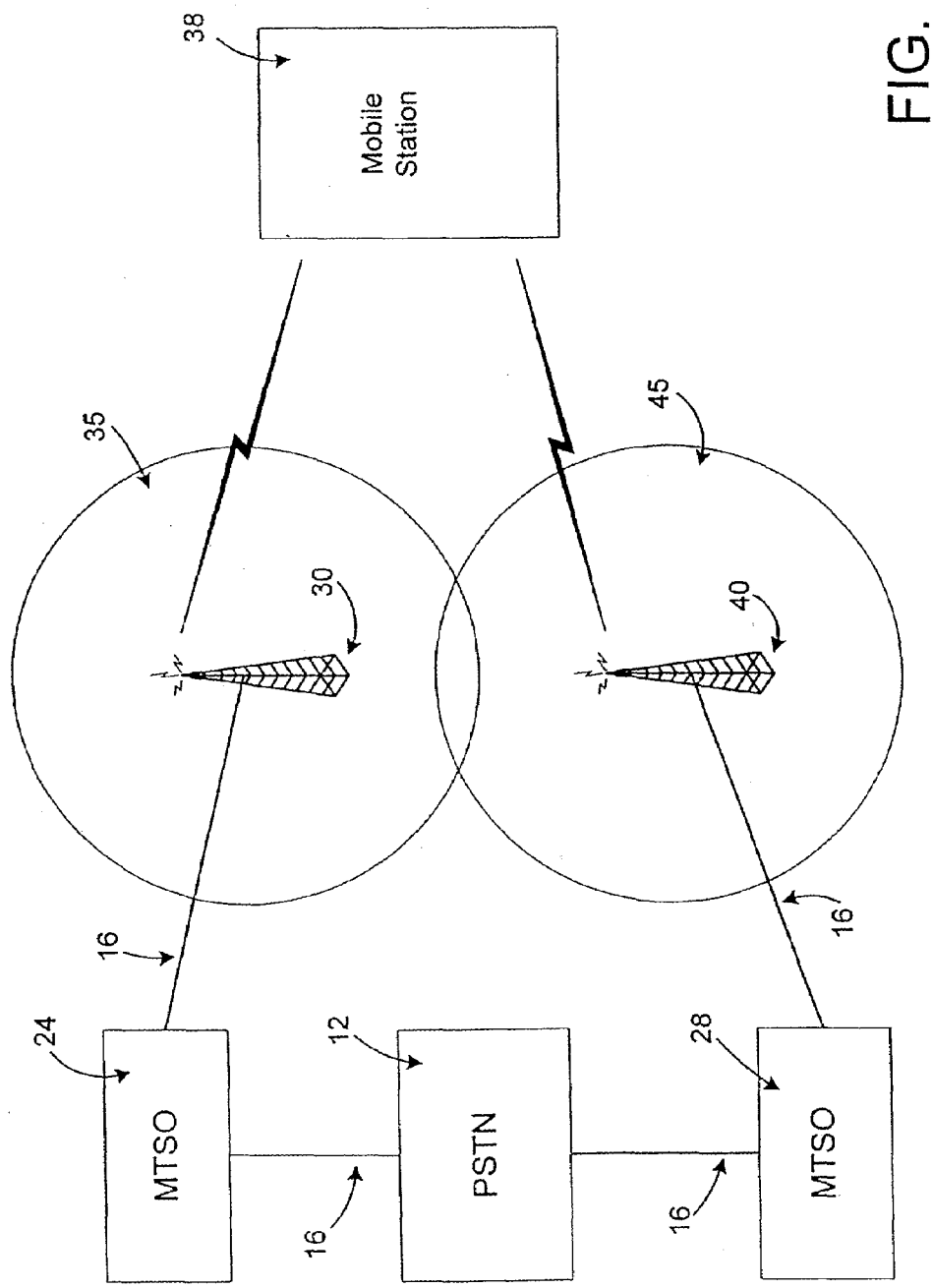
FIG. 1 illustrates the basic components of a conventional cellular network system.
Figure 2A:
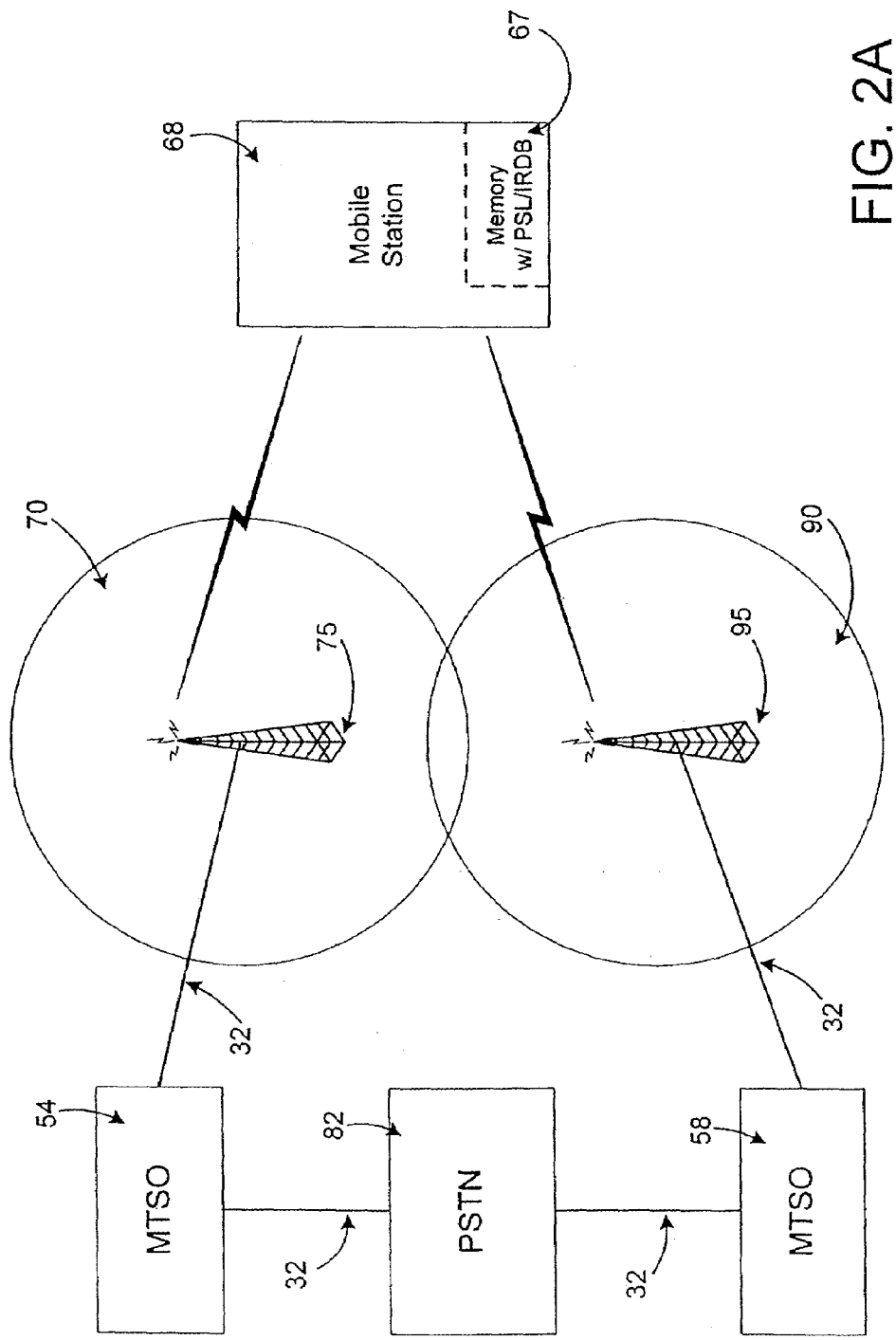
FIG. 2A illustrates exemplary components of a cellular or PCS network system implemented according to aspects of the present invention.
Figure 2B:
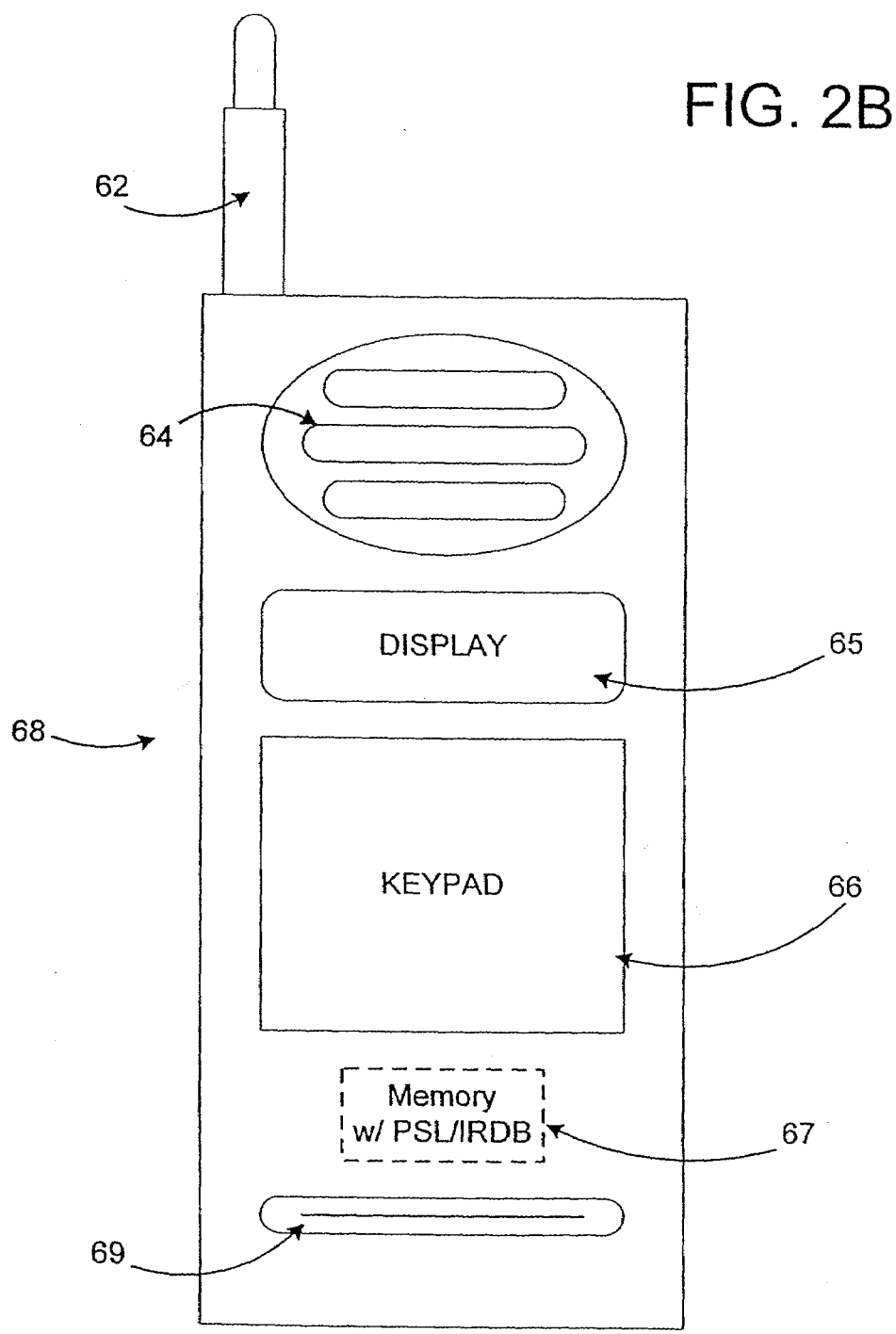
FIG. 2B illustrates, in accordance with an aspect of the present invention, an exemplary mobile station implemented as a wireless phone unit.
Figure 2C:
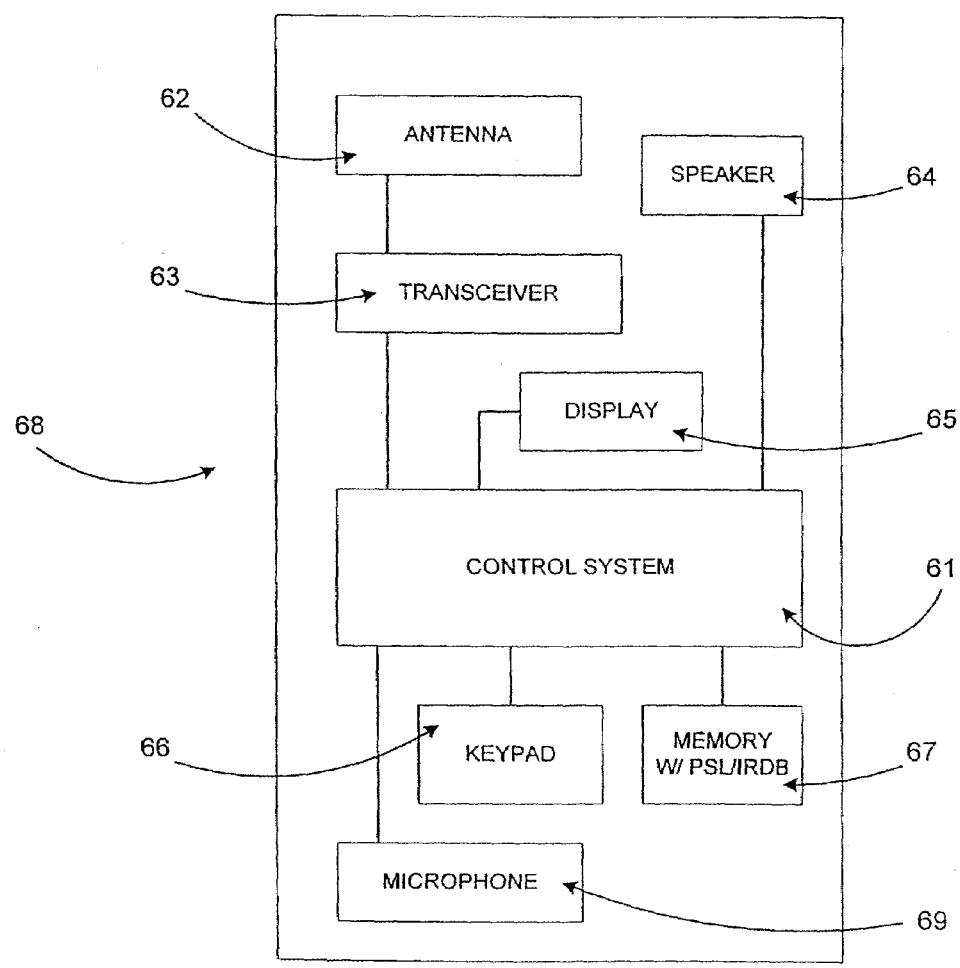
FIG. 2C is a general block diagram of the components of the mobile station of FIG. 2B, in accordance with an aspect of the present invention.

FIGS. 2A-2C illustrate an exemplary network architecture and exemplary system components for implementing the intelligent roaming capabilities of the present invention. In FIGS. 2A-2C, a mobile station-based approach is provided for implementing the intelligent roaming capabilities of the invention. According to the mobile station-based approach of the invention, each mobile station is programmed with intelligent roaming capabilities so that it can determine which system it should obtain service on prior to registration. As will be appreciated from the following description, the mobile station-based approach for providing intelligent roaming capabilities has several advantages, including the ability to integrate into conventional cellular or PCS network environments without requiring modification to the main network components, and without requiring any changes to current network interface standards (e.g., IS-41) or air interface standards (e.g., IS-136, IS-91A, IS-95).

In FIG. 2A, exemplary components of a cellular network implemented with the features of the present invention are illustrated. Although the present invention is described with reference to a cellular network environment, the present invention may also be applied to other network environments (e.g., PCS or PCN network environments), in which a different radio frequency, lower powered cell sites and smaller cell areas are utilized. In FIG. 2A, a mobile station 68 is provided with a memory device 67 for storing a Preferred System Identification List (PSL) and/or Intelligent Roaming Database (IRDB). According to an aspect of the present invention, the PSL/IRDB may be preprogrammed into the mobile station prior to activation of the unit and/or may be reprogrammed and updated by using, for example, a physical interface (such as a computer interface) or over-the-air programming techniques, such as those discussed below. The PSL/IRDB indicates the band or bands where a mobile station may find a preferred system when roaming. That is, the PSL/IRDB may include the SID and/or SOC corresponding to the wireless carrier the mobile station should use for wireless communication in order to obtain the services required by the subscriber. Furthermore, the PSL/IRDB may include information on the band the mobile station should communicate over in accordance with the National Account to which the subscriber is a member.

The mobile station 68 may comprise portable phone units, units installed in vehicles and fixed subscriber units. By way of non-limiting example, the mobile station 68 may be implemented as a cellular telephone unit with a transceiver and antenna (see, for example, FIGS. 2B and 2C) to communicate by, for example, radio waves with one or more cell sites. In FIG. 2A, cell sites 75 and 95 are illustrated. The mobile station 68 may place or receive calls by communicating with cell site 75 or cell site 95, depending upon the location of the mobile station and the cell coverage area that is provided by each cell site. That is, when mobile station 68 is located within cell coverage area 70 it may communicate with cell site 75, and when it is located within cell coverage area 90 it may communicate with cell site 95. As will be appreciated by those skilled in the art, the actual cell coverage area for a cell site will depend upon various factors, including the power of the transceiver of the cell site, the placement and location of the cell site, and the topography of the surrounding areas where the cell site is located. Further, although only two cell sites are depicted in FIG. 2A, the cellular network may of course include more than two cell sites. Moreover, it should be noted that the various components of the cellular network depicted in FIG. 2A are provided for the purpose of illustration only, and that other types of network arrangements may of course be provided to implement the features of the invention. In addition, more than one cell site may be served by each MTSO.

Various air-interface technologies (e.g., TDMA, CDMA, PACS, GSM and PCS-1900) may be utilized to facilitate communication between the mobile station and the cell sites. Each of the cell sites 75 and 95 may include, for example, a radio transceiver (not shown) and may be connected by landlines 32 or other communication links to Mobile Switching Centers (MSCs) or Mobile Telephone Switching Offices (MTSOs) 54 and 58. Landlines 32 may also be utilized to connect the MTSOs 54 and 58 to the Public Switched Telephone Network (PSTN) 82. The MTSOs 54 and 58 may also be connected to a Short Message Service Center (SMSC) (not shown in the drawings) to facilitate the delivery of short messages to mobile station 68.

The MTSOs 54 and 58 may be conventional digital telephone exchanges that control the switching between the PSTN 82 and the cell sites 75 and 95 to provide wireline-to-mobile, mobile-to-wireline and mobile-to-mobile call connectivity. The MTSOs may provide various functions, including (i) processing mobile station status data received from the cell site controllers, (ii) handling and switching calls, (iii) processing diagnostic information, and (iv) compiling billing information. The transceiver (not shown) of each cell site 75 and 95 may provide communication services, such as voice and data communication, with mobile station 68 while it is present in its cell coverage area. Tracking and switching of the mobile station from cell site to cell site may be handled by the MTSOs, as the mobile station passes through various cell coverage areas. When, for example, mobile station 68 passes from one cell to another cell, the MTSO of the corresponding cell may perform a "hand-off" that allows the mobile station to be continuously serviced if on a voice or data call.

As shown in FIG. 2B, the mobile station 68 may be implemented as a cellular or wireless phone unit that comprises an antenna 62, a speaker 64, a microphone 69, a display 65, and a keypad 66 for entering alphanumeric information. The phone unit of mobile station 68 may be constructed in a similar fashion to that of a conventional cellular telephone, with the exception of unique programming and memory configurations and contents for implementing the intelligent roaming aspects of the present invention. Further, the memory 67 of the mobile station 68 may be configured to handle a greater capacity than that of a conventional cellular telephone, in order to accommodate the PSL/IRDB and other operational information of the present invention.

Accordingly, mobile station 68 may include a speaker 64 that comprises a conventional speaker for converting electrical audio signals received by antenna 62 into acoustic audio signals, and a microphone 69 that comprises a conventional microphone for converting voice utterances of a user from acoustic audio signals into electrical audio signals for transmission by antenna 62. In addition, display 65 and keypad 66 may be implemented by conventional display and keypad devices for displaying and permitting entry of alphanumeric and other information. By way of a non-limiting example, display 65 may comprise dedicated status lights and/or a liquid crystal display (LCD) to indicate the status of the cellular telephone unit (e.g., "No Service", "Roam", etc.). Further, keypad 66 may comprise menu selection buttons and/or a conventional twelve button, alphanumeric keypad for initiating and receiving calls, and programming or selecting operating conditions for the mobile station.

Memory 67 of the mobile station 68 may store the PSL/IRDB and other operational information of the present invention. Memory 67 may comprise a read-write memory device that has an independent power supply so the contents will not be effected by power downs of ordinary duration. By way of non-limiting examples, memory 67 may be implemented by a programmable Electronically Erasable Programmable Read Only Memory (EEPROM), a Complimentary Metal Oxide Semiconductor (CMOS) memory chip, or a conventional Random Access Memory (RAM) with an independent power supply.

The handset storage capability provided by memory 67 may vary among different types or models of the mobile stations. Preferably, low tier mobile stations should be able to store a minimum of 30 preferred SIDs and high tier mobile stations should be capable of storing a minimum of 100 preferred SIDs. Further, dual band handsets designed to support commercially available service carriers, typically can store up to 88 SIDs and/or SOCs. To address the variability in PSL/IRDB storage capability in mobile stations, the entries in the PSL/IRDB should be prioritized, and the mobile stations can truncate the PSL/IRDB once the maximum storage capacity is reached.

An exemplary block diagram representation of the components of the mobile station 68 depicted in FIG. 2B is provided in FIG. 2C. As discussed above, the cellular telephone unit of the mobile station 68 may comprise an antenna 62, a speaker 64, a display 65, a keypad 66, and a microphone 69. The antenna 62 may be connected to a transceiver 63, which in turn is connected to a control system 61. Control system 61 may be implemented as a microprocessor-based, control system and may be programmed to carry out the intelligent roaming features and logic of the present invention. The programming of control system 61 may be carried out by any suitable combination or use of software, hardware and/or firmware. Control system 61 may control the various components of the mobile station 68 to permit a user to send and receive calls and program the mobile station. In addition, control system 61 may have access to memory 67, in which the PSL/IRDB and other programming information is stored, for directing operation of the mobile station. A more detailed description of the various processes and functions of the intelligent roaming features of the present invention, as well as the logic steps associated with the intelligent roaming method, is provided below with reference to the accompanying drawings.

Figure 3:
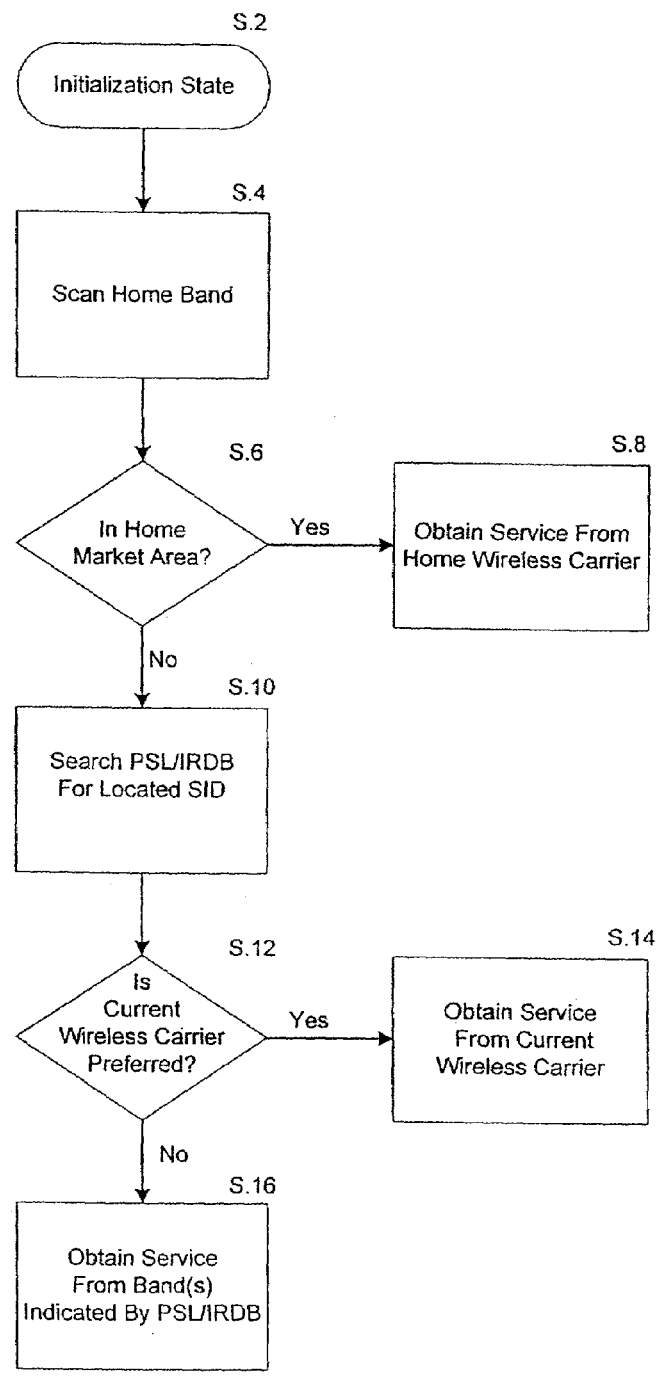
FIG. 3 is a flow diagram of the processes and operations of an intelligent roaming process, according to an embodiment of the invention.

Referring now to FIG. 3, an exemplary logic flow diagram of the intelligent roaming process or method of the present invention will be discussed, in accordance with an embodiment of the present invention. The various processes and operations illustrated in FIG. 3 may be carried out by control system 61 of the mobile station 68 through the use of programmed logic or firmware. The intelligent roaming process of the present invention permits each mobile station to automatically obtain service from the most appropriate and/or preferred wireless carrier. Although the description below is made with reference to a cellular network environment, the various processes and operation may also be applied to PCS or PCN network systems.

In FIG. 3, a mobile station enters an initialization state at step S.2, when the mobile station is powered ON, changes systems, is in a "No Service" condition, or when an Intelligent Roaming mode (IR Mode) has been selected by the user. After the mobile station has been initialized, the mobile station first scans for its home band (i.e., the set of frequencies corresponding to its home network system) at step S.4 to locate a control channel. The set of frequencies corresponding to the home band of the mobile station may be programmed into the mobile station's memory (e.g., memory 67) by the home system service provider.

At step S.6, the mobile station determines whether it is in its home system or market area. Whether or not the mobile station is located in its home market area may be determined by analyzing the SID, SOC or equivalent system identification number of the cellular service provider for the area in which the mobile station is located. By comparing the SID or SOC received on the control channel with the home SID or SOC of the home service provider, the mobile station may determine whether it is located in its home system. As described above, the home SID or SOC may be stored in the NAM of the mobile station, or may be stored in another appropriate memory or storage device of the mobile station. For example, the home SID or SOC may be stored separately from the PSL/IRDB of the mobile station, or may be stored in memory 67 as part of the PSL/IRDB.

If the mobile station determines that it is located in its home market area, then at step S.8, the mobile station will stay on that band and obtain service from the home wireless carrier/cellular service provider. However, if the mobile station determines that it is not in its home market area, then at step S.10 the PSL/IRDB stored in the mobile station will be accessed and searched at step S.12 to determine if the received SID or SOC corresponds to the preferred wireless carrier for the current market area. If the received SID or SOC corresponds to the SID or SOC of the preferred wireless carrier, at S.14 the mobile station 68 obtains service from the current wireless carrier transmitting the received SID or SOC. However, if at S.12 the mobile station 68 determines the current SID or SOC is not the preferred SID or SOC, the mobile station obtains service from the band indicated in the PSL/IRDB at step S.16.

In accordance with an aspect of the present invention, the PSL/IRDB stored in the mobile station may comprise a table of entries including the SIDs and/or SOCs and corresponding frequency band(s) of the preferred service providers for each market area. The preferred service providers may correspond to cellular service providers the mobile station's home system has a reciprocal agreement or billing arrangement with to provide service when the mobile station is roaming. In addition, the preferred system may also be defined and/or selected according to a preferred or required air interface technology. Entries in the PSL/IRDB may be the SIDs or SOCs associated with each region within which one or more preferred service providers exist (e.g., the PSL/IRDB may include entries for one or more of the SIDs and/or SOCs assigned in the North American cellular system). If more than one preferred or target system exists for a given region, then the preferred systems in an PSL/IRDB entry may be listed in order of preference and/or the air interface technology may be provided for each preferred system so that the mobile station may select the most appropriate system for that region. An example of the information fields or elements for the PSL/

IRDB and PSL/IRDB entries is provided below in Table 1. In the PSL/IRDB, there is one carrier per market area. However, in the case where the carrier covers only part of the market area, a second carrier may also be provided. For example, PCS Service Provider A covers only part of the Washington, D.C. market area. If the preferred carrier in Washington, D.C. is PCS Service Provider A and the mobile station 68 is outside of the PSC Service Provider A's coverage, the mobile station must communicate via a different carrier and, therefore, the second carrier for that market area (Washington, D.C.) from the PSL/IRDB is used.

TABLE 1

PSL/IRDB Entries

| Market Area | SID and/or SOC | Frequency |
|---|---|---|
| Market Area 1 | Preferred SID/SOC for Market Area 1 (and Alternative SID/SOC if required) | Corresponding Band |
| Market Area 2 | Preferred SID/SOC for Market Area 2 (and Alternative SID/SOC if required) | Corresponding Band |
| ... | ... | ... |
| Market Area N | Preferred SID/SOC for Market Area N (and Alternative SID/SOC if required) | Corresponding Band |

In Table 1, N represents the total number of market areas within the country/geographic area the cellular/PCS system covers.

Because some markets operate using multiple SIDs, PSLs/IRDBs will need to be administered on a per SID basis. Even within a given market (SID), different PSLs/IRDBs will be required to support different classes of service. This can be demonstrated by an example of two cellular subscribers who roam into a geographic area (e.g., Austin) from the same market (e.g., Dallas). If one subscriber desires to receive Short Message Service, they may roam to a service provider supporting that service (e.g., Service Provider A) while the other subscriber who requires only voice (a class of service hereinafter referred to as wireless POTS (Plain Old Telephone Service)) may roam to another service provider providing a more attractive roaming rate (e.g., Service Provider B). This is required because not all service providers will support all classes of service. The roaming paradigm must change to accommodate scenarios like these.

Table 2 lists exemplary wireless features of the mobile stations and identifies them with classes of service, based on the requirements to provide these features.

TABLE 2

Classes of Service For Wireless Features

| Wireless Feature | Requirements to Provide Feature | Resulting Class of Service |
|---|---|---|
| Wireless Plain Old Telephone Service (POTS) | Roaming Agreement (RA) | Class of Service 1 |
| Analog Circuit-Switched Data | RA | Class of Service 1 |
| Private Systems (PSIDs) | RA, Digital Control Channel (DCCH) | Class of Service 2 |
| Short Message Service (SMS) | RA, DCCH | Class of Service 2 |
| Message Waiting Indicator (MWI) | RA, DCCH | Class of Service 2 |
| Extended Battery Life | RA, DCCH | Class of Service 2 |

TABLE 2-continued

Classes of Service For Wireless Features

| Wireless Feature | Requirements to Provide Feature | Resulting Class of Service |
|---|---|---|
| TDMA Packet Data | RA, DCCH+, DTC+ (where + indicates that the channel requires enhanced capabilities to support this service) | Class of Service 3 |
| Voice Privacy | RA, DCCH, Digital Traffic Channel (DTC) | Class of Service 3 |
| Digital Circuit-Switched Data | RA, DCCH, DTC | Class of Service 3 |

National Accounts may require different PSLs/IRDBs than the more general mass market. For instance, preferred roaming rates may be negotiated for a National Account in one geographic location which would cause the National Account subscriber to prefer a service provider different from the service provider preferred by the mass market subscribers.

An exemplary National Accounts database according to a preferred embodiment of the present invention is illustrated below in Table 3. Without any loss in generality, Table 3 shows PSLS instead of IRDBs. Because a wireless carrier in different home market areas typically has different roaming partners, each home market's PSL/IRDB may be different. Consequently, the parameters and information fields in Table 1 should be replicated for each home market area. Thus, for each home market area, a PSL/IRDB is generated depending on the National Account Group a subscriber is a member of and the class of service required by the subscriber. In Table 3, there are n classes of service (COS) and m National Accounts (NA). $NA_0$ represents the mass market account. The database of Table 3 may be stored within a switch or computer in the central office (message center). Although one such database should be provided for each home market area, one database could serve multiple markets. In Table 3, a National Account database is illustrated for home market area 1. This database may serve or be used for other home market areas (e.g., home market areas 2 through p, where p is the total number of home market areas), or separate databases may be provided for each home market area that exists.

TABLE 3

Database Representation

| Home Market Area 1 | $COS_1$ | $COS_2$ | ... | $COS_n$ |
|---|---|---|---|---|
| $NA_0$ | $PSL_{01}$ | $PSL_{02}$ | | $PSL_{0n}$ |
| $NA_1$ | $PSL_{11}$ | $PLS_{12}$ | | $PSL_{1n}$ |
| ... | ... | ... | | ... |
| $NA_m$ | $PSL_{m1}$ | $PSL_{m2}$ | | $PSL_{mn}$ |

The size and configuration of the National Accounts database may be configured according to system preferences and/or requirements. Table 4 below indicates an exemplary configuration for the databases, indicating the number of databases and the size of each field for each database.

TABLE 4

Database Sizing

| Entry | Size | Comment |
| --- | --- | --- |
| Number of Home Market Area databases | 32 | |
| Classes of Service | 16 | Some reserved for future use, e.g., PCS-1900, CDMA |
| National Accounts | 512 | |
| Preferred SIDs | 100 max. per COS/NA per Home Market Area | |
| Alpha Tags | 3 per Home SID | For Home SID Alpha Tag, Preferred SID Alpha Tag, Neutral SID Alpha Tag |

In Table 4, alpha tags relate alpha numeric system identities that are typically displayed on the mobile station's display screen upon registration with the system. The alpha tages may be stored in the memory or the PSL/IRDB of the mobile station.

The PSL/IRDBs are generated for each National Account upon the establishment of a National Account. A representative of the company creating the National Account typically selects the preferred carrier for each market area depending on the airtime rates and the class of service required. For example, the wireless carrier with the most favorable airtime rates is typically selected for each market area. However, if it is determined to be imperative to maintain a class of service, the mobile station will switch to the wireless carrier supporting the required class of service, even if a less favorable rate results.

Several events may cause the PSL/IRDB to become outdated. For example, the PSL/IRDB may change whenever the mobile station changes its class of service. Also if the home market service provider establishes a new roaming agreement with a carrier, the rates may change and new PSLs/IRDBs must be generated. Another time the PSL/IRDB may change is when a carrier adds a new technology or class of service. Once the PSLs/IRDBs become outdated, a new list should be downloaded to all mobile stations 68 affected by the update. Such downloading may be carried out by utilizing over-the-air programming (OAP) techniques, such as those discussed below.

Typically, when the mobile station is initially activated, the mobile station 68 is programmed with the PSL/IRDB by an interface that physically connects to the mobile station. The PSL/IRDB for each particular mobile station is selected according to the mobile station's home market area, National Account and class of service. These designators are assigned to each mobile station upon initial activation. However, the database may be downloaded by an interface that uses over-the-air programming (OAP) and downloading. Further, programming of the mobile station 68 may be performed manually through use of the keypad of the mobile station.

In order to provide increased flexibility, such programming and downloading of PSL/IRDB information may be performed over-the-air. In accordance with an aspect of the present invention, over-the-air programming of the PSL/IRDB allows the PSL/IRDB to be initially downloaded and/or updated to the mobile station without requiring the user to bring the mobile station into a service center. The over-the-air programming capability of the present invention provides several advantages, including improving the ease by which the mobile station can be programmed with new preferred system information as it becomes available to the home cellular or PCS operator.

Figure 4:
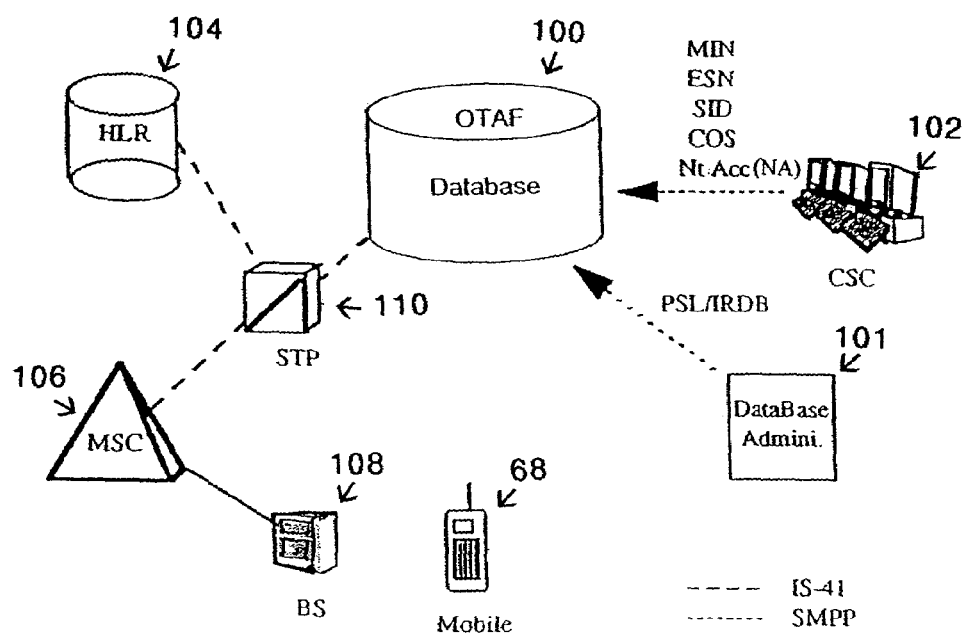
FIG. 4 is a diagram of an exemplary architecture that may be used to download the PSL/IRDB to a mobile station, according to an embodiment of the present invention.

FIG. 4 illustrates a top level architecture or arrangement for the PSL/IRDB downloading using Over-the-Air Activation (OAA) and Over-the-Air Programming (OAP). As shown in FIG. 4, an application referred to as an Over-the-Air Activation Function (OTAF) 100 is stored at an external platform. The OTAF 100 may be implemented with software or programmed logic, and be adapted to perform the various functions described herein. The OTAF 100 may be provided together with a database including the tables and entries described above with reference to Tables 3 and 4. The platform at which the OTAF 100 and database are provided may be a special purpose platform or may be incorporated into an existing platform, such as a Short Message Service Center (message center), a local switch, a Home Location Register (HLR), or a Service Control Point (SCP) of an Advanced Intelligent Network (AIN). In order to perform administrative functions on the database of the OTAF 100, including populating and/or modifying PSL/IRDB entries in the database, a database administration access mechanism 101 may be provided. The database administration access mechanism 101 may be provided locally or remotely from the OTAF 100 and may be controlled and operated by a human operator. For example, the database administration mechanism 101 may include an operator terminal provided at the Message Center (MC) or at the Customer Service Center (CSC). In addition, the database administration access mechanism 101 may include any known type of input source. Exemplary access schemes into the OTAF 100 include: (1) an OTAF platform administrative terminal, (2) a TCP/IP feed directly from the Customer Service Center (CSC), and (3) a dial-up modem connection from a remote facility. Preferably, the information is input via the Short Message Peer-to-Peer (SMPP) protocol which runs over TCP/IP.

In accordance with an aspect of the invention, the database of the OTAF 100 may also maintain a subscriber database of all active mobile stations that are capable of receiving a new roaming database or table entries. The subscriber database may be generated by the Customer Service Center (CSC) 102 and provided as input to the OTAF 100. When a customer activates (or reactivates) a mobile station 68, the CSC 102 enters a subscriber profile into the subscriber database. The profile preferably includes routing identification information, such as Mobile Identification Number (MIN), Electronic Serial Number (ESN) and Private System IDs (PSIDs) for downloading into the mobile station 68. At this time, the subscriber is preferably assigned a class of service (COS) designator and a home SID which are also entered into the subscriber database. From this subscriber database, the OTAF 100 is able to generate and send out the new or updated roaming database to each mobile station on record. For this purpose, the OTAF 100 may include a generator that generates a list of preferred wireless carrier identities for the mobile station by comparing the entries and information in the database with the profile criteria of the mobile station, including the selected COS, National Account and/or the home market area of the mobile station. In addition, a preferred air-interface technology may be defined for the mobile station by the CSC 102 and provided as input to the OTAF 100 as additional criteria for generating a list of preferred carrier identities for the mobile station. The appropriate PSL/IRDB entries are then forwarded to the mobile station by the OTAF 100.

More particularly, according to an aspect of the invention, the PSL/IRDB entries may be generated and downloaded to each mobile station in accordance with the following procedure.

When a subscriber calls the Customer Service Center (CSC) 102 to activate a mobile station handset 68, the CSC 102 representative assigns a MIN for the handset, identifies the features to which the subscriber is allowed, and determines the National Account status (either mass market ($NA_0$) or a particular National Account). The CSC 102 automatically identifies the Home SID based on the MIN, and the Class of Service based on the subscriber's features. The CSC 102 then sends the MIN, ESN, Home SID, COS, and National Account (NA) to the OTAF 100. The CSC 102 may also determine and send the preferred air-interface technology to be utilized by the mobile station as additional profile criteria to the OTAF 100, as noted above. The OTAF 100 matches the Home market area or SID, COS, and/or NA with a PSL/IRDB entry in the database, to generate a list of preferred wireless carrier identities for the mobile station. If provided by the CSC 102, other criteria may also be utilized to select preferred carriers, such as the air-interface technology defined for the mobile station. After generating the list of preferred wireless carrier identities, the OTAF 100 then proceeds to program the handset using, for example, the defined IS-136A message set.

In the reprogramming scenario, the PSL/IRDB will be downloaded with other OTAF information similar to that for new activations. In other words, upon reprogramming, if the National Account (NA), COS, MIN and/or any other parameters change, each changed parameter is reprogrammed or downloaded into the mobile station 68 along with the new PSL/IRDB. If none of the parameters have changed, only the updated PSL/IRDB is downloaded to the mobile station 68.

When a PSL/IRDB needs to be updated, personnel may enter the new (or modified) roaming PSL/IRDB into the OTAF 100 via, for example, an external terminal entry or the database administration mechanism 101. A wireless carrier's personnel will then set a flag in the OTAF 100 indicating that a new PSL/IRDB for a particular COS/NA has been entered and needs to be sent to mobile stations designated with that COS/NA.

The OTAF 100 then queries the subscriber's Home Location Register (HLR) 104 via, for example, one or more Signaling Transfer Points (STP) 110 to identify and determine the subscriber's mobile station 68 status and location. A throttling scheme is active at this point to limit the numbers of queries sent to each HLR 104 in order to prevent overload. For example, a craft settable throttling mechanism may be utilized in order to prevent flooding of the Home Location Register (HLR) 104 with SMSREQ messages or any other known message protocol for communication with an HLR. The message center (MC) or platform supporting the OTAF 100 preferably has an internal teleservices ID prioritization scheme which pushes messages to the top of the queue based on the teleservices ID. For instance, if multiple messages are being stored for a single subscriber, it may be desired to ensure that the mobile station has the latest roaming database installed before a Cellular Messaging Teleservice (CMT) message is sent. OAA, OAP and CMT are identified by different teleservice IDs.

If the mobile station 68 is available, the HLR 104 will return location information (with, for example, a SMSNOT message) to the OTAF 100 (by way of, for example, one or more STPs 110) to permit routing of the PSL/IRDB entry information to the mobile station 68 via the serving Mobile Switching Center (MSC) and the wireless network infrastructure. As illustrated in FIG. 4, the wireless network infrastructure for communicating with the mobile station 68 may include one or more Mobile Switching Centers (MSC) 106 and Base Stations (BS) 108. Once the location of the mobile station 68 is determined from the HLR 104 (and/or Visiting Location Register (VLR)—not illustrated in FIG. 4), the OTAF 100 will route (via the appropriate STP 110) the database information to permit the serving MSC 106 and BS 108 to relay the PSL/IRDB entry information to the mobile station 68 by wireless communication, including transmission over-the-air. The wireless communication between the BS 108 and the mobile station 68 may preferably use the IS-136 standard, although any known standard may be used. Communication between each MSC 106 and BS 108 may use conventional wired or wireless communication links.

If the mobile station 68 is unavailable, the HLR 104 will set an internal flag to notify the OTAF 100 when the handset or mobile station becomes active and/or registers. When the OTAF 100 receives location information on the mobile station 68, the OTAF 100 sends the new roaming PSL/IRDB to the mobile station 68, as described above. Thereafter, normal OAA and/or OAP logic flow or processing may be carried out according to industry or forum defined standards and protocols (such as the standards and protocols set for IS-136 by the Universal Wireless Communications Committee (UWCC) or an open industry forum/group).

As described above, a throttling scheme may be used to prevent overloading of the network. For example, if a new roaming agreement is reached with another wireless carrier, many handsets will be effected. Consequently, the downloading of the new databases to all of the mobile stations will overload the network. Therefore, a craft-settable throttling mechanism, i.e., to identify the number of maximum databases to update at a time, is provided. Furthermore, the throttling mechanism may allow favoring of one National Account over another when updating the databases, i.e., downloading the new data to subscribers of one National Account before downloading data to subscriber of other National Accounts. Conventional throttling techniques may be used for this purpose.

Figure 5:
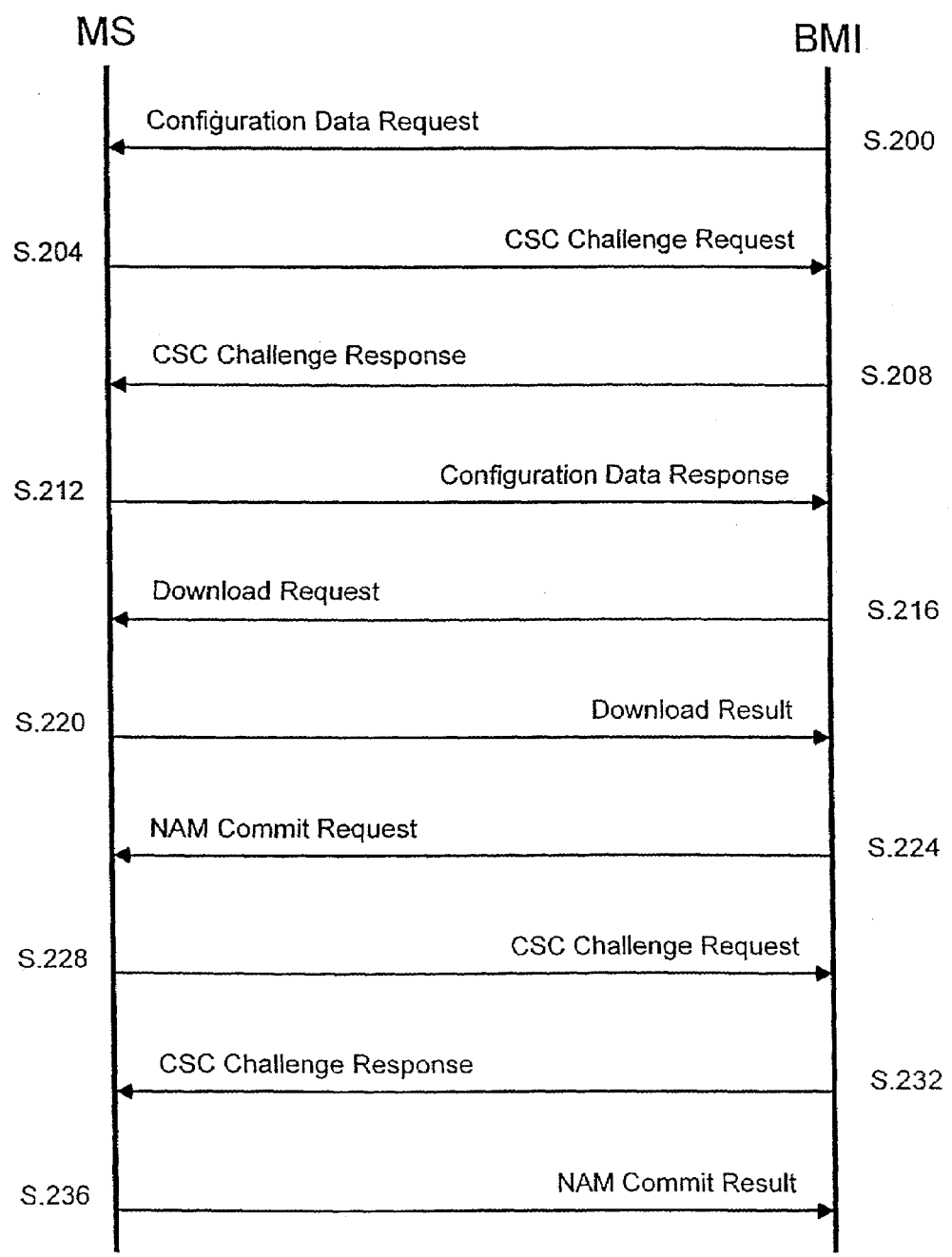
FIG. 5 illustrates an exemplary message flow for performing over-the-air programming of a mobile station, according to an embodiment of the present invention.
Figure 6:
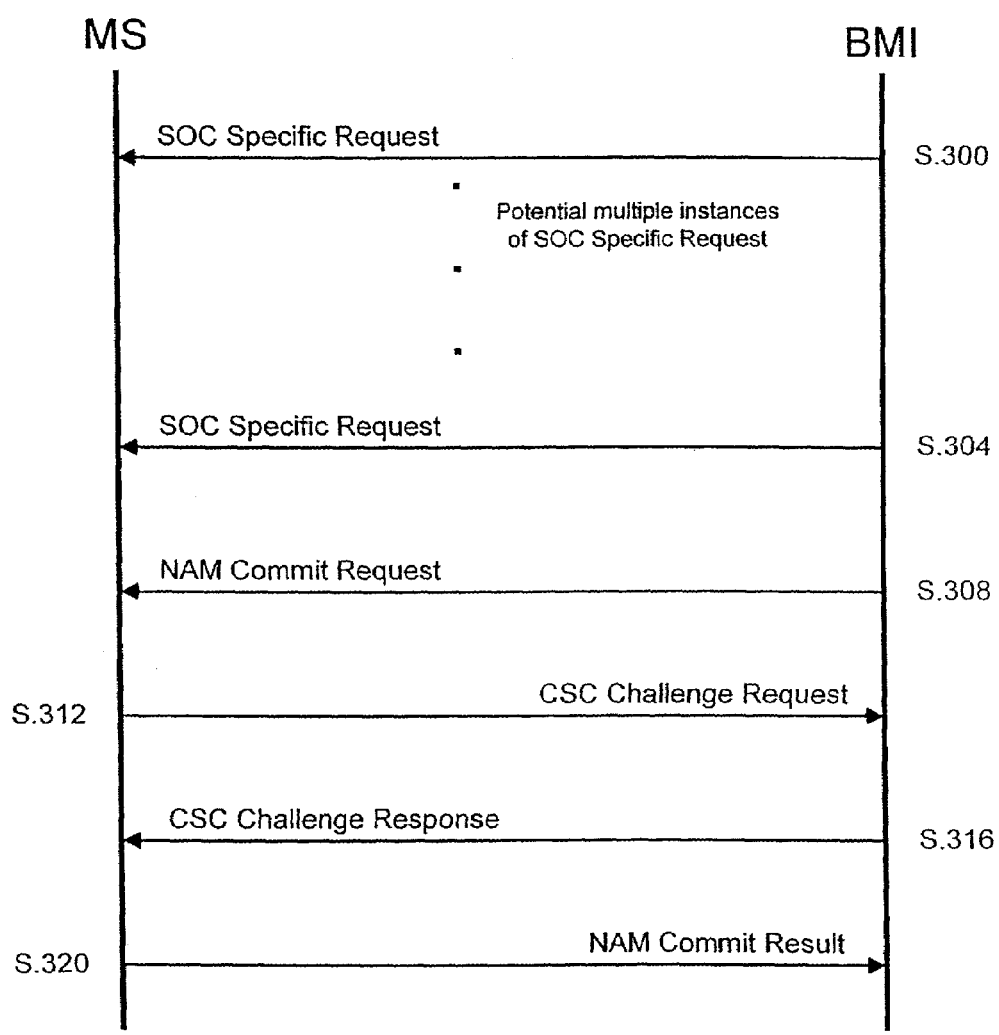
FIG. 6 illustrates, in accordance with another embodiment of the present invention, an exemplary message flow for performing over-the-air programming of a mobile station.

Referring now to FIGS. 5 and 6, exemplary embodiments of the present invention for providing over-the-air programming of the PSL/IRDB to the mobile station will be described. In accordance with the invention, over-the-air programming of the PSL/IRDB may be accomplished as part of the Over-the-Air Activation Teleservice (OATS) defined in the Addendum to Interim Standard 136A (IS-136A) of the North American Cellular System, or as a different teleservice. A teleservice is generally an end-to-end data application between a mobile station and a network entity (e.g., a message center or Over-the-Air Activation Function (OTAF)) that is typically independent of and transparent to a Base Station/Mobile Switching Center/Interworking Function (BMI). The BMI provides the teleservice transport, but is not directly involved in processing the actual teleservice data. For additional information concerning OATS, OTAF and BMI, see the Addendum to IS-136 Revision A contained in TIA/EIA/IS-136.1-A-1, *Addendum No. 1 to TIA/EIA/IS-136.1-A*, Telecommunications Industry Association, November 1996, the disclosure of which is expressly incorporated herein by reference in its entirety. For information on over-the-air activation (OAA) and over-the-air programming (OAP), see "Bell-South Cellular and Southwestern Bell Joint Requirements Document: Interim Over-The-Air Activation for 850 MHz IS-136 Mobile Stations", Version 1.1, Feb. 17, 1997, and "Intelligent Roaming", Contribution Submitted by AT&T Wireless Services, Inc. to TIA TR45.3.6, Apr. 28-30, 1997, the disclosures of which are expressly incorporated herein by reference in their entireties.

According to one embodiment of the present invention, the over-the-air programming of the PSL/IRDB may be made part of OATS, by standardizing and providing new information elements to program the mobile station with the PSL/IRDB, i.e., the intelligent roaming data (see, for example, FIG. 5 and the accompanying description provided below). Alternatively, in accordance with another embodiment of the present invention, the over-the-air programming of the PSL/IRDB may be made part of the OATS by embedding the new information as messages within the System Operator Code (SOC) Specific Request message defined for OATS. The System Operator Code (SOC) is a twelve bit value that is broadcasted on the control channel (normally a DCCH) and used to identify which operator is providing service. In the two embodiments described below, if a PSL/IRDB entry is duplicative of another PSL/IRDB entry stored in the mobile station, then a new PSL/IRDB entry may overwrite the old PSL/IRDB entry in memory. In addition, if there is a large quantity of PSL/IRDB information that needs to be stored in the mobile station, the initial downloading of all of the PSL/IRDB information may be performed by a physical interface or connection (e.g., during manufacture of the mobile station), and subsequent updates or reprogramming of specific data in the PSL/IRDB may be performed over-the-air.

FIG. 5 illustrates, in accordance with an embodiment of the present invention, an exemplary diagram of message flows between a Mobile Station (MS) and the Base Station/Mobile Switching Center/Interworking Function (BMI) for implementing over-the-air programming of the PSL/IRDB based on OATS. The MS comprises a station used by a cellular or PCS subscriber to access network services over an air interface. The MS may be implemented as a portable phone unit, a unit installed in a vehicle or a fixed subscriber station. Base stations provide the ability for each MS to access network services over an air interface. An MSC or MTSO is connected to at least one base station, and may use inter-working functions to connect to other networks.

According to an aspect of the present invention, the BMI includes the network entity that stores a centralized or master PSL/IRDB database, and that oversees the programming of the PSL/IRDB in each of the mobile stations. The same network entity that provides OATS may also provide the over-the-air programming of the PSL/IRDB for the mobile stations. OATS may be used on either a Digital Traffic Channel (DTC) or a Digital Control Channel (DCCH). If there is a large quantity of PSL/IRDB information to be programmed, multiple Download Request messages may be sent to the mobile station in order to program all of the intelligent roaming data. In FIG. 5, CSC is an acronym for the Customer Service Center, and NAM is an acronym for Number Assignment Module in the mobile station.

According to the embodiment of FIG. 5, the existing OATS messages are used for over-the-air programming of the PSL/IRDB in the mobile station. However, new information elements and fields are defined, according to the present invention, for some of the OATS messages in order to program the mobile station with the PSL/IRDB information. The particular OATS messages that are modified to incorporate the PSL/IRDB information include, for example, the Confirmation Data Request, the Configuration Data Response, the Download Request, and the Download Result messages, which are indicated in FIG. 5 and discussed in detail below.

When a Configuration Data Request message is sent from the BMI to the MS at step S.200, specific configuration data blocks are solicited from the mobile station. An example of the contents of a modified Configuration Data Request message, according to an aspect of the invention, is indicated below in Table 5. In Table 5, and in the subsequent tables discussed below, the "Type" may be either Mandatory (M) or Optional (O), and the "Length" is given in bits. Further, for Table 5 and the subsequent tables provided herein, the new information elements and modifications to the OATS-based messages are underlined in the tables.

TABLE 5

Configuration Data Request

| Information Element | Type | Length |
|---|---|---|
| Message Type | M | 6 |
| Remaining Length (in Octets) | M | 8 |
| Configuration Data Block Map | M | 16 |

As shown in Table 5, the Configuration Data Request may be modified to include a new entry in the Configuration Data Block Map. The Configuration Data Block Map is an information element or data message that provides a list of the Configuration Data Blocks for which the BMI requests configuration information from the MS. As shown below in exemplary embodiment of Table 6, the Configuration Data Block Map may include specific values for a NAM Configuration Data Block request and a Non-Public System Configuration Data Block request. In addition, according to the present invention, values may be provided for a Band Info request and System Access List request for the purpose of programming the mobile station. A more detailed discussion of the Band Info and System Access List data blocks of the present invention is provided below. In Table 6, and the subsequent tables, the value "X" (where present) represents that the value may be assigned either a value of zero or value of one.

TABLE 6

Configuration Data Block Map

| Value | Function |
|---|---|
| XXXX XXXX XXXX XXX1 | NAM Configuration Data Block requested |
| XXXX XXXX XXXX XX1X | Non-Public System Configuration Data Block requested |
| XXXX XXXX XXXX X1XX | Band Info requested |
| XXXX XXXX XXXX 1XXX | System Access List requested |

All other values may be reserved

At step S.204, a CSC Challenge Request is sent from the MS to the BMI in response to receiving the Configuration Data Request. The CSC Challenge Request that is sent by the MS may be similar to the OATS-based CSC Challenge Request. Following step S.204, an OATS-based CSC Challenge Response is sent by the BMI at step S.208 in response to the CSC Challenge Request from the MS, and then a Configuration Data Response is sent at step S.212. While the OATS-based CSC Challenge Request and the CSC Challenge Response are not modified, the standard Configuration Data Response message for OATS is modified, according to the present invention, with new information elements so that the mobile station can provide, for example, information to the BMI on the currently stored intelligent roaming information (i.e., Band Info and PSL/IRDB). Table 7A shows an exemplary configuration of the modified Configuration Data Response, and Table 7B illustrates exemplary parameter type codes for the optional information elements in the Configuration Data Response of Table 7A, in accordance with an aspect of the invention. In Table 7A, and the subsequent tables, the "*" represents that the maximum bit length or range of the bit length is only limited by the defined length of the overall application layer message.

TABLE 7A

Configuration Data Response

| Information Element | Type | Length |
| --- | --- | --- |
| Message Type | M | 6 |
| Remaining Length (in Octets) | M | 8 |
| NAM Configuration Data Block | O | 8 or 212-648 |
| Non-Public Configuration Data Block | O | 12 - * |
| System Operator Code (SOC) | O | 16 |
| Index Code | O | 36 |
| Band Info | O | 27 |
| System Access List | O | 35 - * |

TABLE 7B

Parameter Codes for Optional Information Elements

| Parameter Type | Code |
| --- | --- |
| NAM Configuration Data Block | 0001 |
| Non-Public Configuration Data Block | 0010 |
| System Operator Code (SOC) | 0011 |
| Index Code | 0100 |
| Band Info | 0101 |
| System Access List | 0110 |

As shown in Table 7A, the Configuration Data Response message of the present invention is similar to the Configuration Data Response for OATS except that for the invention a Band Info information element and a System Access List information element are also included in the message. The Band Info information element may contain data that identifies, for example, the home band and the secondary band, as well as other data to support intelligent roaming. The System Access List information element may contain PSL/IRDB data entries for the mobile station to use in identifying the preferred system(s) to access in an intelligent roaming mode. Examples of the data fields for the Band Info and System Access List information elements are provided below with reference to Tables 9 and 14, respectively. Exemplary parameter type codes that may be used for the optional information elements of the Configuration Data Response of Table 7A are provided in Table 7B. As shown in Table 7B, new parameter type codes may be provided for the Band Info and the System Access List information elements.

Referring to FIG. 5, after the Configuration Data Response message has been sent to the BMI, a Download Request message is sent to the MS at step S.216. The Download Request message is sent to the mobile station in order to download specific configuration data. According to the present invention, the Download Request message may be modified to include the Band Info and System Access List information elements. An example of the modified Download Request Message is shown in Table 8A, and Table 8B includes exemplary parameter type codes that may be used for the optional information elements in the Download Request message of Table 8A.

TABLE 8A

Download Request

| Information Element | Type | Length |
| --- | --- | --- |
| Message Type | M | 6 |
| Remaining Length (in Octets) | M | 8 |
| NAM Download | O | * |
| Non-Public Download | O | * |
| Band Info | O | 26 |
| System Access List | O | 35 - * |

TABLE 8B

Parameter Codes for Optional Information Elements

| Parameter Type | Code |
| --- | --- |
| NAM Download | 0001 |
| Non-Public Download | 0010 |
| Band Info | 0011 |
| System Access List | 0100 |

The Band Info information element that is provided as part of the Configuration Data Response message and Download Request message may be used to identify, for example, the home band, the probability block map for the home band, and the secondary band to support the intelligent roaming capabilities of the present invention. The Band Info information element is a new OATS information element. Table 9 illustrates an example of a Band Info information element, according to an aspect of the present invention.

TABLE 9

Band Info

| Field | Length |
| --- | --- |
| Parameter Type | 4 |
| SID Alpha Tag Control | 1 |
| Home Band | 3 |
| Probability Block Map | 16 |
| Secondary Band | 3 |

In the Band Info information element, a Parameter Type code (e.g., 0011) may be included to indicate the parameter type, and a SID Alpha Tag Control field (i.e., a SAT_Ctrl field) may be included to indicate when the Home SID Alpha Tag should be displayed. If, for example, the SID Alpha Tag Control field is set to one, then the mobile station will be instructed to display the Home SID Alpha Tag. If, on the other hand, the SID Alpha Tag Control field is set to zero, the Home SID Alpha Tag will not be displayed. A Home Band field may also be provided in the Band Info information element to indicate the frequency band for the home system. Further, as shown in Table 9, a Probability Block Map field may also be provided to indicate the most likely probability blocks in which a control channel may be found by the mobile station. Tables 12 and 13 are, respectively, exemplary Home Band and Probability Block Map fields that may be utilized to implement the features of the present invention.

As further shown in Table 9, the Band Info information element may include a Secondary Band field. The Secondary Band field may be provided to identify the secondary frequency band for the mobile station to scan if no acceptable control channels can be found on the home band. The Secondary Band field may be coded in a similar manner to the Home Band field described below (see, for example, Table 12).

In response to the Download Request message from the BMI at step S.216, a Download Result message is sent at step S.220 from the MS to the BMI. In accordance with the present invention, the Download Result message may be a modified OATS message that includes a Download Result Map information element. The Download Result Map information element provides feedback to the BMI on the results of the data block downloads. Table 10A illustrates an exemplary, modified Download Result message, and Table 10B illustrates exemplary parameter type codes of the optional information elements in the Download Result message of Table 10A. In addition, Table 11 is an exemplary Download Result Map information element which may be provided as part of the Download Result message of Table 10A.

TABLE 10A

Download Result

| Information Element | Type | Length |
|---|---|---|
| Message Type | M | 6 |
| Remaining Length (in Octets) | M | 8 |
| Download Result Map | M | 16 |
| Parameter Error | O | * |

TABLE 10B

Parameter Codes for Optional Information Elements

| Parameter Type | Code |
|---|---|
| Parameter Error | 0001 |

TABLE 11

Download Result Map

| Value | Function |
|---|---|
| XXXX XXXX XXXX XXX0 | NAM download unsuccessful |
| XXXX XXXX XXXX XXX1 | NAM download successful |
| XXXX XXXX XXXX XX0X | Non-Public download unsuccessful |
| XXXX XXXX XXXX XX1X | Non-Public download successful |
| XXXX XXXX XXXX X0XX | Band Info download unsuccessful |
| XXXX XXXX XXXX X1XX | Band Info download successful |
| XXXX XXXX XXXX 0XXX | System Access List download unsuccessful |
| XXXX XXXX XXXX 1XXX | System Access List download successful |

All other values may be reserved

After step S.220 in FIG. 5, the subsequent OATS messages may be sent in standardized format to complete the over-the-air programming of the mobile station. That is, at step S.224, a NAM Commit Result message may be sent from the BMI to the MS, and then a CSC Challenge Request message may be sent at step S.228 from the MS to the BMI. Thereafter, at step S.232, a CSC Challenge Response message may be sent to the MS, and then a NAM Commit Result may be sent from the MS to the BMI in step S.236. At this point, the PSL/IRDB and other intelligent roaming data is updated in the memory of the MS, and the MS may proceed to perform intelligent roaming with the updated information.

As described above, the message flow for over-the-air programming of the mobile station may be achieved by utilizing new information elements that are sent based on an OATS message flow. According to an aspect of the present invention, the existing OATS messages that are modified to include these new information elements include, for example, the Configuration Data Request message, the Configuration Data Response message, the Download Request message and the Download Result message, as described above. The new and modified OATS information elements that are provided include, for example, the Band Info information element, which is described above with reference to Table 9, the Configuration Data Block Map information element, which is described above with reference to Table 6, and the Download Result Map information element, which is described above with reference to Table 11. Other new information elements and fields may also be provided to implement the intelligent roaming capabilities of the present invention. Examples of these information elements and fields are discussed below with reference to Tables 12-19.

Table 12 illustrates an exemplary list of coded values for the Home Band field, which may be provided as one of the fields in the Band Info information element (see, for example, Table 9). As discussed above, the Home Band field may indicate the frequency band for the home system of the mobile station. The Home Band field may be three bits in length and assigned one of a plurality of coded values to indicate the frequency band of the home network provider. As shown in Table 12, values may be assigned for both cellular A and B bands, as well as for 1900 MHZ PCS bands.

TABLE 12

Home Band

| Value | Function |
|---|---|
| 000 | 800 MHZ A Band |
| 001 | 800 MHZ B Band |
| 010 | 1900 MHZ A Band |
| 011 | 1900 MHZ B Band |
| 100 | 1900 MHZ C Band |
| 101 | 1900 MHZ D Band |
| 110 | 1900 MHZ E Band |
| 111 | 1900 MHZ F Band |

Table 13 illustrates an exemplary coding of values for the Probability Block Map field. The Probability Block Map field may be provided as one of the fields in the Band Info information element, as discussed above with reference to Table 9. The Probability Block Map field indicates the most likely probability blocks in which a control channel may be found by the mobile station. The probability block members may be defined in accordance with Interim Standard 136.1 (IS-136.1), Revision A, Section 6.3.1.1.1 for each frequency band. For more information on IS-136.1, see for example TIA/EIA-IS-136.1-A, *TDMA Cellular/PCS-Radio Interface-Mobile Station-Base Station Compatibility-Digital Control Channel*, Telecommunications Industry Association, October 1996, the disclosure of which is expressly incorporated herein by reference in its entirety.

TABLE 13

Probability Block Map

| Value | Function |
|---|---|
| 1XXX XXXX XXXX XXXX | 1st probability block likely to contain control channels |
| 0XXX XXXX XXXX XXXX | 1st probability block unlikely to contain control channels |
| . | . |
| . | . |
| . | . |
| XXXX XXXX XXXX XXX1 | 16th probability block likely to contain control channels |
| XXXX XXXX XXXX XXX0 | 16th probability block unlikely to contain control channels |

Table 14 illustrates the various fields that may be provided for the System Access List information element. As discussed above, the System Access List information element may be included in the Configuration Data Response message (see step S.212) and the Download Request message (see step S.216). The System Access List information element may contain PSL/IRDB entries for the mobile station to use in identifying the preferred system to access when in an intelligent roaming mode. As shown in Table 14, the System Access List information element may include a field to indicate the number of PSL/IRDB entries that are present (e.g., a Number of Target Systems field), and may include one or more PSL/IRDB entries that are provided for each SID included in the System Access List information element. The System Access List information element may also include a coded Parameter Type field (e.g., 0100) to indicate the parameter type. Table 15 illustrates an example of the fields for an PSL/IRDB entry, which is used to indicate the target or preferred systems for the mobile station when roaming.

TABLE 14

System Access List

| Field | Length |
|---|---|
| Parameter Type | 4 |
| Number of PSL/IRDB Entries (S) | 7 |
| PSL/IRDB Entry (S + 1 instances of this field are present) | (S + 1) × (24 + 40 × T) |

TABLE 15

PSL/IRDB Entry

| Field | Length |
|---|---|
| Current SID | 15 |
| Roam Indicator | 1 |
| Scan Method | 2 |
| Scan Time | 2 |
| Number of Target Systems (T) | 4 |
| Target System Info (T instances of this field are present) | (40 × T) |

As shown in Table 15, each PSL/IRDB entry may include a Current SID field to indicate the current SID that the entry is associated with, a Roam Indicator field to indicate the status of the roam indicator, a Scan Method field to indicate the scan method to be utilized by the mobile station, a Scan Time field to indicate the scan time, a Number of Target Systems field to indicate the number of preferred or target systems, and a Target System Info field for each target system. Each PSL/IRDB entry may be accessed by the mobile station by looking up the SID of the current system and comparing it with the Current SID field of each entry in the System Access List until a match is found. The Roam Indicator field may be used in each PSL/IRDB entry to indicate whether the roam indicator should be displayed by the mobile station for the current system. For example, when the Roam Indicator field is set to one, this field will indicate that the mobile station should display the roam indicator. If, however, the Roam Indicator field is set to zero, the roam indicator should not be displayed by the mobile station.

The Scan Method field of each PSL/IRDB entry may indicate how the mobile station should scan for a target system. Table 16 illustrates an example of the coded values that may be assigned to the Scan Method bit field, as well as the related function for each coded value. If, for example, the Scan Method field has a value of zero, then the mobile station should perform a continuous scan until it finds a target system. If, on the other hand, the Scan Method field is equal to one, then the mobile station should obtain service on the current SID and scan for target or preferred systems periodically.

TABLE 16

Scan Method

| Value | Function |
|---|---|
| 00 | Continuous scan until find a target system |
| 01 | Obtain service on current SID and scan for target systems periodically |

All other values may be reserved

The Scan Time field of each PSL/IRDB entry indicates the approximate interval between scans for a target system. Table 17 illustrates various coded values that may be assigned to the Scan Time field. The scan time interval may be set based upon various factors, including the operating conditions of the mobile station. For example, the battery power of the mobile station may effect the scan time interval, such that a longer scan time interval may be desirable to reduce the number of required scans and consumption of the battery. By way of a non-limiting example, a scan time interval of two and one-half or five minutes may be utilized. As shown in the embodiment of Table 17, if the Scan Time field is set to zero, then the scan time will be set such that the mobile station will perform a scan every two and one-half minutes. If the scan time is set to one, then a longer scan time may be used by the mobile station. For example, in Table 17, a scan time field value of one would cause the mobile station to perform a periodical scan every five minutes.

TABLE 17

Scan Time

| Value | Function |
|---|---|
| 00 | Periodically scan every 2½ minutes |
| 01 | Periodically scan every 5 minutes |

All other values may be reserved

As noted above, each PSL/IRDB entry may include a field to indicate the number of target systems (i.e., a Number of Target Systems field), and a field to indicate the target system information for each target system (i.e., a Target System Info field). Target system information may be provided for each target or preferred system that exists for the current SID. The number of target systems for a current SID will vary depending upon, for example, the reciprocal agreements or billing arrangements that the home network provider has with providers for the current SID. Table 18 illustrates an exemplary Target System Info field and the information that may be included in the Target System Info field.

TABLE 18

Target System Info

| Field | Length |
|---|---|
| Target Band | 3 |
| Technology Map | 5 |
| Target SID | 15 |
| Roam Indicator | 1 |
| Probability Block Map | 16 |

As shown in Table 18, the Target System Info may include a Target Band field which identifies the frequency band for a target or preferred system. The Target Band field may be coded in a similar manner to the Home Band field (see, for example, Table 12). A field to indicate the SID of the target system (i.e., a Target SID field), as well as a field to indicate the roam indicator display status for the target system (i.e., a Roam Indicator field) may also be provided. The Roam Indicator field of the Target System Info may indicate to the mobile station when a roaming status indication should be displayed when service is obtained on a particular target system. When the Roam Indicator field is set to one, for example, this field may indicate that the mobile station should display the roaming status indication. Otherwise, if the value of the Roam Indicator field is set to zero, the roaming status indication should not be displayed by the mobile station.

As part of the target system information in the Target System Info data block, a Technology Map field may also be provided. The Technology Map field may identify the air-interface technologies (e.g., EIA/TIA-553 (AMPS), IS-136, PCS-1900, etc.) and/or other technologies associated with a particular frequency band of a given target system. Table 19 illustrates examples of the various coded values that the Technology Map field may be assigned to indicate a particular air-interface technology. In the embodiment of Table 19, the unassigned bit values may be held in reserve for future systems or applications (e.g., they could be assigned to PACS, CDMA, or other technologies).

TABLE 19

Technology Map

| Value | Function |
|---|---|
| X XXX1 | EIA/TIA-553 (AMPS) |
| X XX1X | IS-136 |
| X X1XX | PCS-1900 |

All other values may be reserved

Other information relating to each target or preferred system may also be provided as part of the information fields for the Target System Info. For example, a Probability Block Map field may be provided to indicate the most likely probability blocks in which a control channel may be found. An example of the manner in which a Probability Block Map field may be coded is provided above with reference to Table 13.

In accordance with another embodiment of the present invention, the PSL/IRDB and intelligent roaming information may be downloaded and programmed into the mobile station by embedding the over-the-air programming messages within the SOC Specific Request message defined for OATS. According to this embodiment, the BMI will send the SOC Specific Request message to the mobile station (MS), and the MS will respond with the R-DATA ACCEPT message. FIG. 6 illustrates an example of the message flow between the MS and the BMI for over-the-air programming of the mobile station in accordance with this embodiment of the present invention.

In the embodiment of FIG. 6, the intelligent roaming data will only be committed to memory in the mobile station following a NAM Commit Request message from the BMI, and a successful CSC Challenge. If needed, multiple SOC Specific Request messages may be sent to the MS prior to a NAM Commit Request in order to program all of the intelligent roaming data.

At step S.300 in FIG. 6, an SOC Specific Request message is sent from the BMI to the MS. The SOC Specific Request message may be used for SOC Specific Data. Table 16 illustrates an example of the information elements that may be included in each SOC Specific Request message. As shown in Table 20, the SOC Specific Request message may be configured according to the existing message defined for OATS.

TABLE 20

SOC Specific Request

| Information Element | Type | Length |
|---|---|---|
| Message Type | M | 6 |
| Remaining Length (in Octets) | M | 8 |
| System Operator Code (SOC) | M | 12 |
| SOC Specific Data | M | 0 - * |

As shown in step S.304 of FIG. 6, multiple SOC Specific Request messages may be sent to the mobile station prior to the NAM Commit Request, in order to program all of the necessary intelligent roaming data. Each SOC Specific Request message may be used for SOC Specific Data. The SOC Specific Data may be provided as an information element in each of the SOC Specific Request messages. Table 21A illustrates the various information elements and coded contents that may be provided as the SOC Specific Data. When messages are sent, the SOC may be set to a particular code corresponding to the service provider (e.g., 004 hex). The SOC Specific Data may include the Band Info and the System Access List information elements, similar to that described above (see, for example, Tables 9, 14 and 15). Table 21B illustrates an example of the parameter type codes for the optional information elements in the SOC Specific Data information element of Table 21A.

TABLE 21A

SOC Specific Data

| Information Element | Type | Length |
|---|---|---|
| Band Info | 0 | 26 |
| System Access List | 0 | 35 - * |

TABLE 21B

Parameter Codes for Optional Information Elements

| Parameter Type | Code |
| --- | --- |
| Band Info | 0001 |
| System Access List | 0010 |

After all of the SOC Specific Request messages have been sent, a NAM Commit Request message may be sent from the BMI to the MS at step S.308. In response, a SOC Challenge Request message will be sent from the MS to the BMI at step S.312, and a CSC Challenge Response will be returned by the BMI to the MS at step S.316. Thereafter, as shown in FIG. 6, a NAM Commit Result message will be sent at step S.320 from the MS to the BMI to confirm the programming of the intelligent roaming data to the mobile station.

Various techniques and network architectures may be utilized for administering, programming and updating each mobile station with the PSL/IRDB and other intelligent roaming information. For example, as discussed above, a main or centralized database could be established to implement the various aspects of the present invention. Such a centralized database could include information on all of the network systems that the home service provider owns, as well as information on all the systems with which the service provider has preferred roaming agreements or billing arrangements. Entries in the database could encompass, for example, all of the information that is provided to the mobile station as part of the over-the-air programming of the mobile station. Other information could also be included in such a centralized database. For example, the centralized database could contain for each entry in the PSL/IRDB, the name of the cellular service provider for each target or preferred system, a contact, and roaming agreement information.

Figure 7:
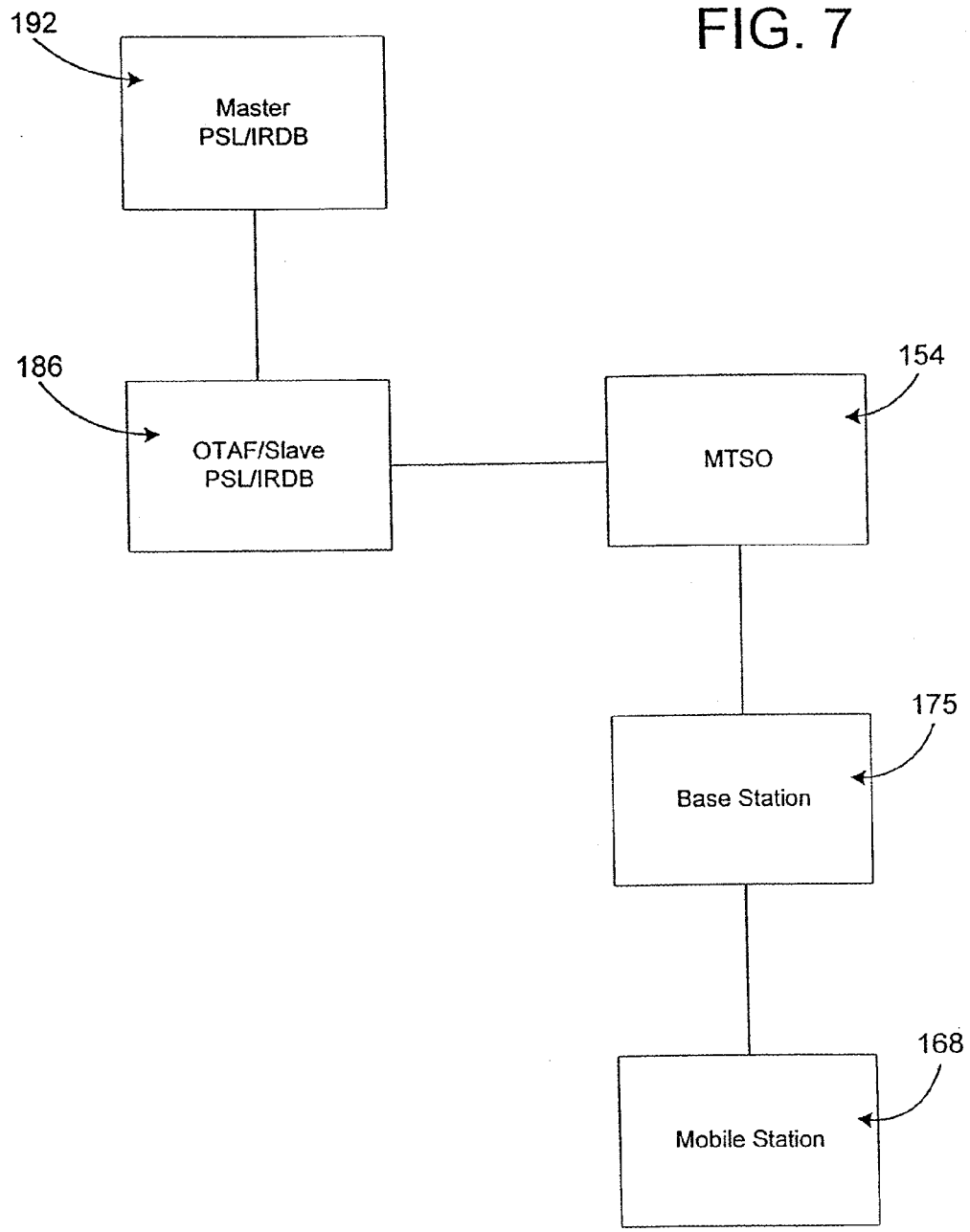
FIG. 7 is a general block diagram of an exemplary network architecture for implementing and administering the intelligent roaming capabilities of the invention.

In accordance with another aspect of the present invention, FIG. 7 illustrates an exemplary network architecture for implementing and administering the intelligent roaming capabilities and features of the present invention. In the embodiment of FIG. 7, a mobile station 168 receives PSL/IRDB information via a centralized or master PSL/IRDB database 192 that has one or more slave PSL/IRDB database arrangements 186. The master PSL/IRDB 192 may be administered centrally by an operator and may contain PSL/IRDB information and other intelligent roaming information for all of the systems that the service provider owns, and all of the systems with which the service provider has preferred roaming agreements. The master PSL/IRDB 192 may comprise a computer or workstation with memory, and a database application for storing all of the PSL/IRDB information and other intelligent roaming information. The master PSL/IRDB 192 may also include a database that indicates all of the mobile stations supporting the intelligent roaming capabilities of the present invention.

Each of the slave PSL/IRDBs 186 may comprise logical entities within, for example, an Over-The-Air Activation Function (OTAF). The OTAF may comprise a software application residing on a computer or workstation, and be adapted to store and forward information to be programmed into the mobile stations. The master PSL/IRDB 192 may update all OTAF/slave PSL/IRDBs 186 with new information concerning target or preferred systems as required or as information becomes available. When the master PSL/IRDB 192 is updated with new PSL/IRDB information, each of the OTAF/slave PSL/IRDBs 186 may receive the information from the master PSL/IRDB 192 through, for example, a Transmission Control Protocol/Internet Protocol (TCP/IP) connection, format the information for the mobile stations, and send the formatted information to the mobile stations through the cellular or PCS network. Along with the new PSL/IRDB information sent from the master PSL/IRDB 192, a list of the mobile stations requiring updating may be sent to all OTAF/slave PSL/IRDBs 186. Each of the OTAF/slave PSL/IRDBs 186 would then be responsible for updating the mobile stations, and may keep track of the mobile stations that have been updated with new intelligent roaming information and those that still require updating. Each of the mobile stations may be identified by its Mobile Identification Number (MIN) or International Mobile Station Identity (IMSI). The mobile station identity may also identify the mobile station's Home Location Register (HLR).

As noted above, each of the OTAF/slave PSL/IRDBs 186 may send the formatted information to the mobile stations through the cellular or PCS network. The Base Station/Mobile Switching Center/Inter-Working Function (BMI) may be used to transfer the information to the mobile stations. When information is received from the master PSL/IRDB 192, the OTAF/slave PSL/IRDB 186 may send, for example, an Interim Standard 41C (IS-41C) message to the mobile station's HLR to determine the location of the mobile station. The HLR may then respond with an address for the serving systems's MSC or MTSO (such as MTSO 154). As illustrated in FIG. 7, the OTAF/slave PSL/IRDB 186 may then communicate over-the-air programming messages for the mobile station, such as mobile station 168, via MTSO 154 using the IS-41C SMS Delivery Point-to-Point (SMDPP) message. The MTSO 154 may then repackage the over-the-air message into, for example, an Interim Standard 136 (IS-136) R-DATA message for delivery to the mobile station 168 through an appropriate base station or cell site 175. Feedback may be provided by the serving MTSO 154 to the OTAF/slave PSL/IRDB 186 (e.g., in the form of another IS-41C message) to indicate whether the information successfully reached the mobile station. If the information was not successfully delivered to the mobile station, the OTAF/slave PSL/IRDB 186 could trigger a retry mechanism to resend the information.

Other features may be provided for administering and implementing the intelligent roaming capabilities of the present invention. For example, as an alternative to the embodiment of FIG. 7, the home network system could broadcast a code indicating when the central PSL/IRDB database was last updated. Based on this code, mobile stations could then determine periodically if they have the most current PSL/IRDB information. When it is determined that the PSL/IRDB information contained in the mobile station is not current, the mobile station could request reprogramming by sending a request message using, for example, OATS message protocols.

While the invention has been described with reference to several exemplary embodiments, it is understood that the words which have been used herein are words of description and illustration, rather than words of limitations. Changes may be made, within the purview of the appended claims, as presently stated and as amended, without departing from the scope and spirit of the invention in its aspects.

For example, although a mobile station-based approach has been disclosed for implementing the intelligent roaming features and capabilities of the present invention, other approaches and methods may be utilized to achieve and implement the various aspects of the present invention. For example, the present invention may be implemented through a network-based approach, whereby PSL/IRDB and preferred system information is directed from a serving network to the mobile station in order to obtain service on the preferred system. In such a case, some or most of the "intelligence" may be provided in the network to facilitate roaming by the mobile station.

Further, although embodiments for over-the-air programming of the PSL/IRDB have been discussed with reference to OATS, over-the-air programming may be implemented as a different or separate teleservice. For example, over-the-air programming may be developed and standardized as a completely new teleservice, or it may be developed as a carrier-specific teleservice. In addition, various over-the-air activation methods or teleservices, including OATS, may be utilized in order to activate new mobile station users. For example, activation information may be programmed in the mobile station using the Digital Control Channel (DCCH) that is associated with IS-136, or an appropriate signaling channel to communicate with a cellular network when not on a voice or data call. Alternatively, the activation information may be programmed in the mobile station using a Digital Traffic Channel (DTC), or an appropriate digital voice or data channel to communicate with a cellular network. If over-the-air activation is performed on the DCCH or the DTC, the new mobile station user may be required to initiate a call to a Customer Service Center (CSC), and to follow a predetermined set of procedures to perform over-the-air activation of the mobile station.

Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed:

1. A computer readable medium that stores a computer program for providing wireless carrier information to a mobile station for determining a preferred wireless carrier, the computer readable medium comprising:
    a storing code segment, recorded on the computer readable medium, executable to store data relating to a plurality of wireless carriers corresponding to a plurality of market areas;
    an identifying code segment, recorded on the computer readable medium, executable to identify at least one wireless carrier from the data relating to the plurality of wireless carriers based on at least one of a class of service and an account of the mobile station; and
    a transmitting code segment, recorded on the computer readable medium, executable to transmit data indicating the identified at least one wireless carrier to the mobile station.

2. The computer readable medium according to claim 1, further comprising:
    a determining code segment, recorded on the computer readable medium, executable to locate the mobile station prior to the transmission of the data indicating the identified at least one wireless carrier.

3. The computer readable medium according to claim 2, in which the determining code segment locates the mobile station by communicating with a home location register associated with the mobile station.

4. The computer readable medium according to claim 2, in which the determining code segment locates the mobile station by communicating with a visitor location register associated the mobile station.

5. The computer readable medium according to claim 1, further comprising:
    an updating code segment, recorded on the computer readable medium, executable to determine when the storing code segment stores updated data relating to at least one of the plurality of wireless carriers, the identifying code segment identifying the at least one wireless carrier from the updated data.

6. The computer readable medium according to claim 5, in which the updated data comprises information indicating that the at least one of the plurality of wireless carriers changed a communication characteristic for one of the plurality of market areas.

7. The computer readable medium according to claim 6, in which the communication characteristic comprises at least one of a roaming airtime rate and an air interface technology.

8. The computer readable medium according to claim 5, in which the transmitting code segment transmits updated data indicating the identified at least one wireless carrier to the mobile station.

9. A computer readable medium that stores a computer program for providing information regarding a plurality of wireless communication systems to a plurality of mobile stations, each mobile station using the provided information to select a preferred wireless communication system from the plurality of wireless communication systems in accordance with at least one of a class of service and an account of each mobile station, the computer readable medium comprising:
    a determining code segment, recorded on the computer readable medium, executable to determine when data corresponding to at least one of the wireless communication systems is outdated;
    a location determining code segment, recorded on the computer readable medium, executable to locate at least one mobile station when the data corresponding to the at least one of the wireless communication systems is determined to be outdated; and
    a providing code segment, recorded on the computer readable medium, executable to send updated data corresponding to the at least one of the wireless communication systems to the at least one mobile station at the determined location.

10. The computer readable medium according to claim 9, in which the updated data comprises at least one of a changed class of service, a changed billing rate or a changed technology.

11. The computer readable medium according to claim 9, in which the updated data comprises a band at which the at least one mobile station can locate the selected preferred wireless communications system from the plurality of wireless communication systems.

12. The computer readable medium according to claim 9, in which locating at least one mobile station comprises determining whether the least one mobile station is registered with a home location register corresponding to the at least one mobile station.

13. The computer readable medium according to claim 11, further comprising:
    a downloading code segment, recorded on the computer readable medium, executable to download the updated data to the at least one mobile station when the mobile station later registers with the home location register.

14. The computer readable medium according to claim 9, further comprising:
a throttling code segment, recorded on the computer readable medium, executable to limit a number of mobile stations to which the updated data is sent over a predetermined period of time.

15. A computer readable medium that stores a computer program for providing information to a mobile station regarding a plurality of wireless communication systems corresponding to a plurality of market areas, the computer readable medium comprising:
a configuring code segment, recorded on the computer readable medium, executable to configure the mobile station with initial data enabling the mobile station to select one of the plurality of wireless communication systems based on at least one of an account and a class of service;
a determining code segment, recorded on the computer readable medium, executable to determine when at least a portion of the initial data changes; and
a providing code segment, recorded on the computer readable medium, executable to send updated data corresponding to the changed portion of the initial data to the mobile station over one of the plurality of wireless communication systems.

16. The computer readable medium according to claim 15, further comprising:
a location determining code segment, recorded on the computer readable medium, executable to locate the mobile station,
wherein the one of the plurality of wireless communication systems over which the updated data is provided is identified based on a determined location.

17. The computer readable medium according to claim 15, further comprising:
a receiving code segment, recorded on the computer readable medium, executable to receive the initial data from an administration terminal.

18. The computer readable medium according to claim 17, in which the initial data is received over a packet switching network.

19. The computer readable medium according to claim 15, in which the updated data comprises information indicating an updated communication characteristic of at least one of the plurality of wireless conunuunication systems.

20. The computer readable medium according to claim 19, in which the updated communication characteristic comprises one of a roaming airtime rate and an air interface technology.

* * * * *

UNITED STATES PATENT AND TRADEMARK OFFICE
CERTIFICATE OF CORRECTION

PATENT NO. : 7,447,499 B2
APPLICATION NO. : 11/480370
DATED : November 4, 2008
INVENTOR(S) : J. Bridges et al.

It is certified that error appears in the above-identified patent and that said Letters Patent is hereby corrected as shown below:

On the Title page, under U.S. Patent Documents, page 2, of the printed patent, in connection to reference 5,950,130 "Coursey" should be --Coursey et al.--.

On the Title page, under Other Publications, page 2, of the printed patent, in connection to reference "Recommendatio GSM 02.11-DCS, Service Accessibility, Version 3.1.0, Released by ETSI/PT12, Nov. 1992." should be --Recommendation GSM 02.11-DCS, Service Accessibility, Version 3.1.0, Released by ETSI/PT12, Nov. 1992.--

On the Title page, under Other Publications, page 2, of the printed patent, in connection to reference "System Selection for Preferred Roaming/Stage 2 & 3 Description, Version 1.2, Telecommunications Industries Assocation (TIA), Enhanced Roaming Team, Feb. 9, 1996." should be --System Selection for Preferred Roaming/Stage 2 & 3 Description, Version 1.2, Telecommunications Industries Association (TIA), Enhanced Roaming Team, Feb. 9, 1996.--

In the claims, column 31, line 67 (claim 4, line 4), of the printed patent, "the mobile" should read --with the mobile--.

In the claims, column 32, line 58 (claim 12, line 3), of the printed patent, "the least" should be --the at least--.

UNITED STATES PATENT AND TRADEMARK OFFICE
CERTIFICATE OF CORRECTION

PATENT NO. : 7,447,499 B2
APPLICATION NO. : 11/480370
DATED : November 4, 2008
INVENTOR(S) : J. Bridges et al.

It is certified that error appears in the above-identified patent and that said Letters Patent is hereby corrected as shown below:

In the claims, column 34, line 20 (claim 19, line 4), of the printed patent, "conununication" should be --communication--.

Signed and Sealed this

Sixteenth Day of June, 2009

JOHN DOLL
*Acting Director of the United States Patent and Trademark Office*